(12) United States Patent (10) Patent No.: US 8,360,879 B2
Yamamoto (45) Date of Patent: Jan. 29, 2013

(54) GAME MACHINE AND GAME PROGRAM FOR OVERTURNING OR SPINNING A PLAYER OBJECT ON A DISPLAY SCREEN

(75) Inventor: Kenji Yamamoto, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2834 days.

(21) Appl. No.: 10/408,113

(22) Filed: Apr. 8, 2003

(65) Prior Publication Data

US 2003/0211887 A1 Nov. 13, 2003

(30) Foreign Application Priority Data

May 9, 2002 (JP) ................................. 2002-134533

(51) Int. Cl.
*A63F 13/00* (2006.01)
(52) U.S. Cl. ............................................ 463/31; 463/33
(58) Field of Classification Search ................ 463/64, 463/6, 31, 33
See application file for complete search history.

(56) References Cited

U.S. PATENT DOCUMENTS

| | | | | |
|---|---|---|---|---|
| 5,921,780 A | * | 7/1999 | Myers | 434/69 |
| 5,959,613 A | * | 9/1999 | Rosenberg et al. | 345/161 |
| 6,117,008 A | * | 9/2000 | Machiguchi | 463/6 |
| 6,171,186 B1 | * | 1/2001 | Kurosawa et al. | 463/31 |
| 6,217,445 B1 | * | 4/2001 | Inoue | 463/6 |
| 6,336,864 B1 | * | 1/2002 | Nakanishi | 463/33 |
| 6,368,111 B2 | * | 4/2002 | Legarda | 434/236 |
| 6,632,138 B1 | * | 10/2003 | Serizawa et al. | 463/6 |

FOREIGN PATENT DOCUMENTS

| | | |
|---|---|---|
| EP | 0 836 873 A1 | 4/1998 |
| EP | 0 933 105 | 8/1999 |
| EP | 1 136 105 A1 | 9/2001 |
| JP | 11-143353 | 5/1999 |
| JP | 11143353 | * 5/1999 |
| JP | 2000-005447 | 1/2000 |

OTHER PUBLICATIONS

Sega. Daytona USA Deluxe Demo. Oct. 23, 1997. CNET Networks. http://www.download.com/Daytona-USA-Delux-demo/3000-7551_4-877228.html.*
The gamespot.com. Daytona USA screenshot. http://img.gamespot.com/images/screenshots/2/197062/daytondx_screen003.jpg.*
Coin-Op Musueum. Daytona USA. 1994. http://www.klov.com/game_detail.php?letter=&game_id=7530.*

(Continued)

*Primary Examiner* — Dmitry Suhol
*Assistant Examiner* — J. T. Liddle
(74) *Attorney, Agent, or Firm* — Nixon & Vanderhye P.C.

(57) ABSTRACT

In an overturn determination process, it is determined that a race kart that is a player object is to be overturned if the race kart is changed into a predetermined pose. In an overturn process, the race kart is forcedly overturned and spun only during a first predetermined time period T1 by experiencing external forces that causes an overturn, and the race kart is rotated by inertia only during a second predetermined time period T2 without experiencing the external forces. Then, a process is performed for bringing the direction of the player kart's height close to the normal vector of the ground and bringing the traveling direction of the race kart close to the pre-overturn traveling direction, whereby the race kart is recovered to a state capable of running again. While the race kart is overturned, an operation control process is not performed, and an operation input from the controller is not accepted.

20 Claims, 14 Drawing Sheets

OTHER PUBLICATIONS

IGN.com. Daytona USA (pc edition). 2001. http://media.dreamcast.ign.com/media/015/015836.imgs_2.html.*

Industrial Property Digital Homepage. Machine translation of JP 11-143353. http://www4.ipdl.ncipi.go.jp/Tokujitu/PAJdetail.ipdl?N0000=60&N0120=01&N2001=2&N3001=H11-143353.*

First Generation NFS, http://firstgennfs.rscsites.org/tnfsse.php.*

Rally Cross, http://www.angelfire.com/ak/dbarrett/rallycross.html.*

Stunt Car Racer, http://s64.emuunlim.com/manuals/stuntcarracer.htm.*

MobyGames Need for Speed, http://www.mobygames.com/game/playstation/need-for-speed-ii.*

MobyGames SSX Tricky, www.mobygames.com/game/xbox/ssx-tricky.*

MobyGames Wave Rally, www.mobygames.com/game/ps2/wave-rally.*

Kasavin, "Final Fantasy X Review", http://uk.gamespot.com/ps2/rpg/finalfantasy10/review.html, 5 pages, Dec. 14, 2001.

Satterfield, "Burnout Review", http://uk.gamespot.com/gamecube/driving/burnout/review.html, 3 pages, Apr. 26, 2002.

http:/www.s64.emuulim.com/manuals/stuntcarracer.htm—Stunt Car Racer, game released in 1989.

http:/www.Gbacentral.net/interviews/smallrockets24062001.html—Interview with Small Rockets Jun. 24, 2001.

http:/www.angelfire.com/ak/dbarrett/rallycross.html—Rally Cross.

http:/www.simracingworld.com/content/198/ simracingworld.com—Neil's GP3 ideas, 1999.

Office Action date May 4, 2010 issued in corresponding German Application No. 103 20 678.7-35 with an at least partial English-language translation thereof.

\* cited by examiner

FIG. 4

KART DATA

POSITION  P = (x, y, z)

SPEED  V = (vx, vy, vz)

ACCELERATION  A = (ax, ay, az)

POSE MATRIX Pose
 PoseX = (PoseXx, PoseXy, PoseXz)
 PoseY = (PoseYx, PoseYy, PoseYz)
 PoseZ = (PoseZx, PoseZy, PoseZz)

DEGREE OF POSE VARIATION
 dPose (dPosex, dPosey, dPosez)

•
•
•

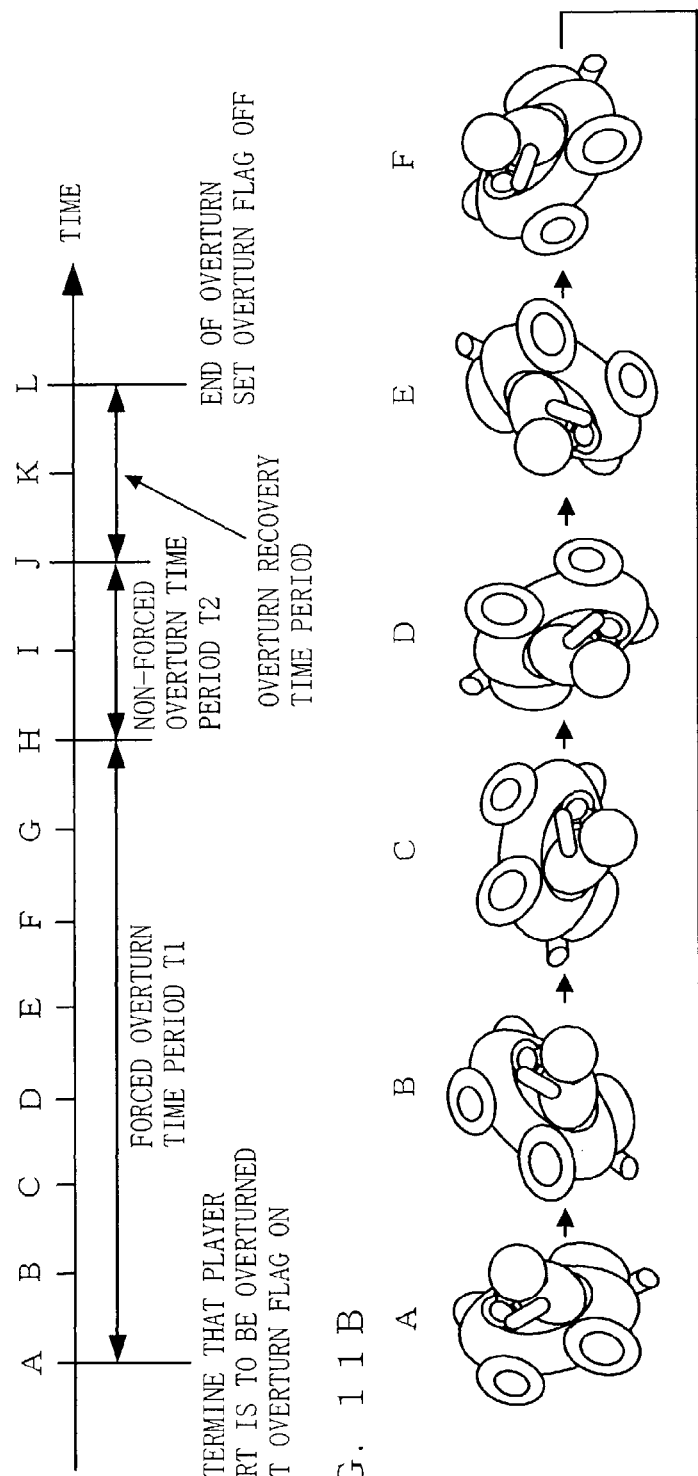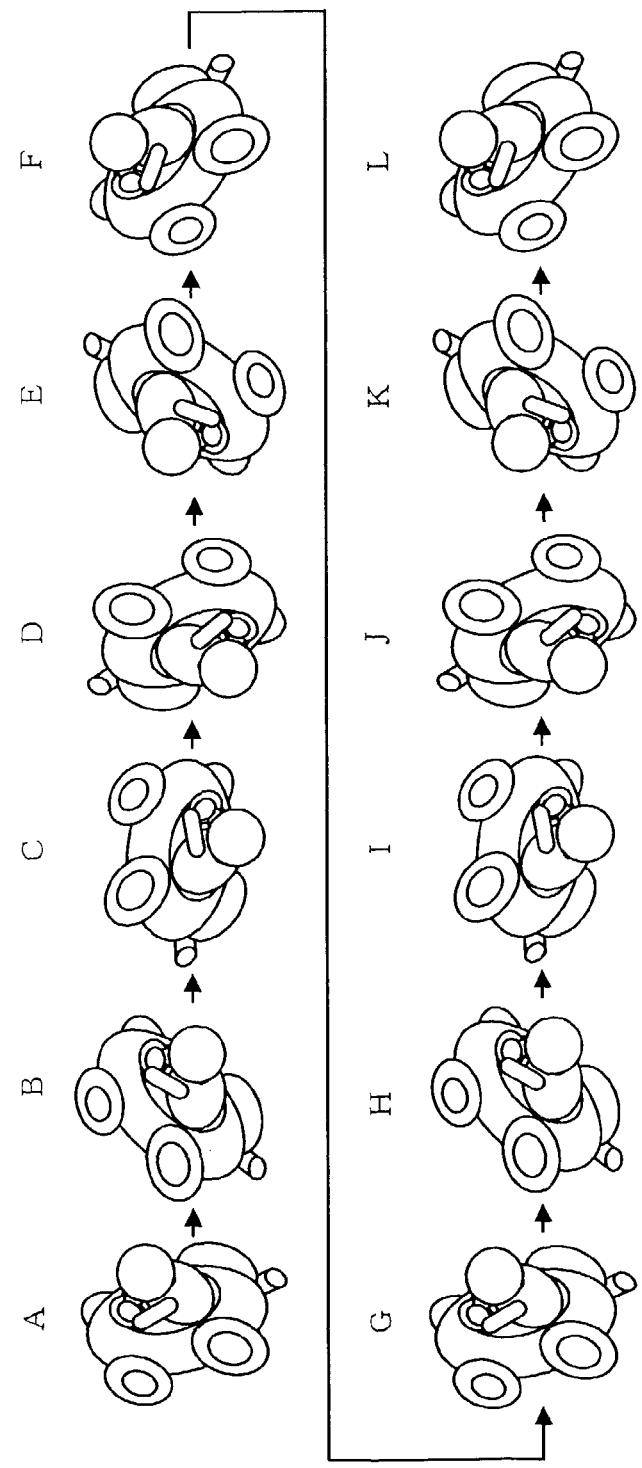

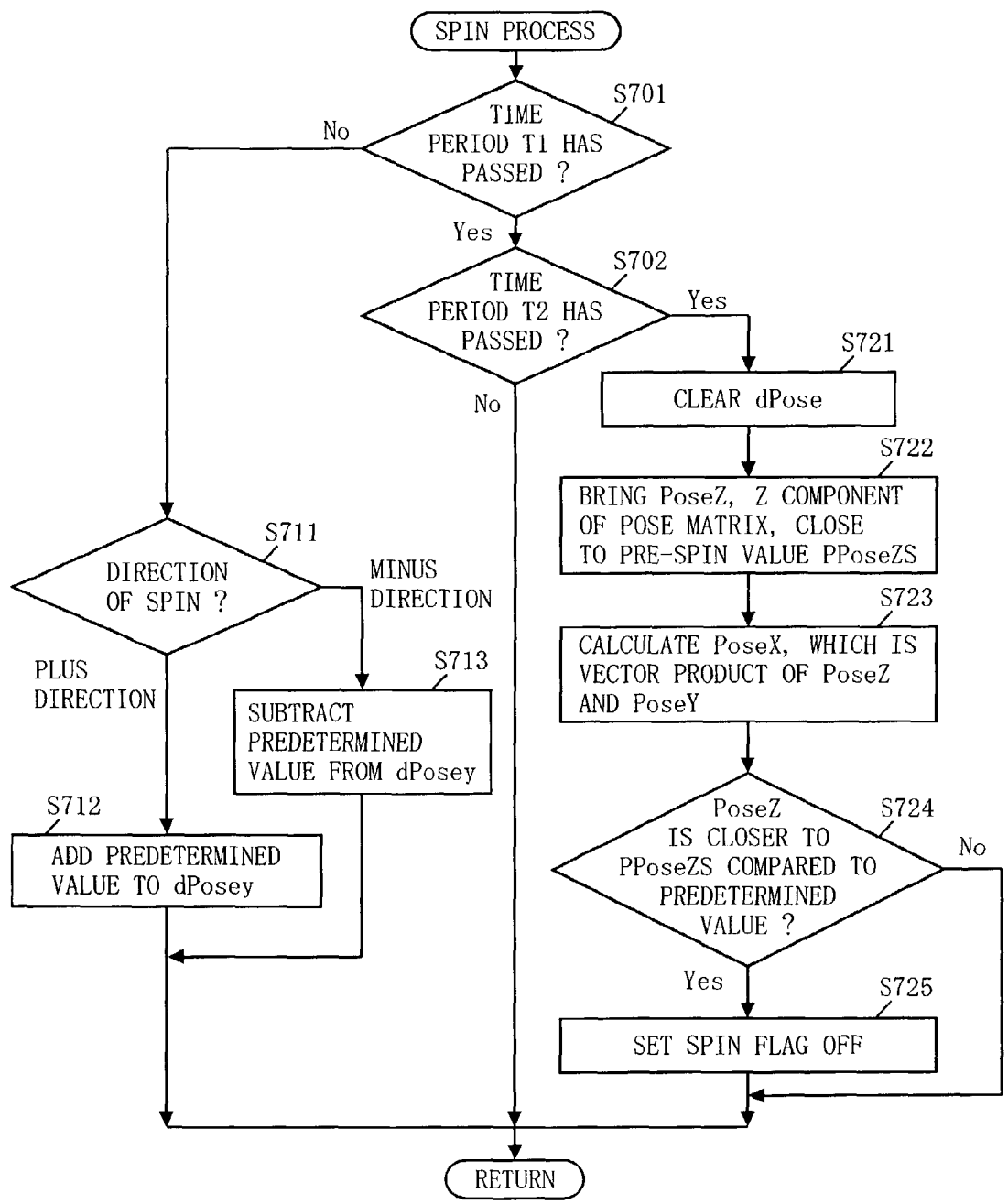

GAME MACHINE AND GAME PROGRAM FOR OVERTURNING OR SPINNING A PLAYER OBJECT ON A DISPLAY SCREEN

BACKGROUND AND SUMMARY OF EXAMPLE EMBODIMENTS OF THE INVENTION

Example embodiments of the present invention relates to game machines and game programs that execute to overturn or spin a player object on a display screen when the player object is changed into a predetermined state. The game machine performs processing in accordance with a game program for restarting a game smoothly after the player object is overturned or spun.

There have been many games, provided for video game machines, requiring a player to use a controller for controlling a movement of a player object appearing in a game space. Such games are typified by racing games. In a racing game, one or more race karts appear in the game space. The number of the race karts typically corresponds to the number of players. Each player uses the controller for operating his/her race kart on a predetermined course set in the game space in order to achieve a high ranking in a kart race. In the above described racing game, a race kart corresponds to a player object.

The game machine may perform game control for overturning the player object when the player object changes into or reaches a predetermined state during the game. For example, in the racing game, game control is performed for overturning the race kart if the race kart exceeds a speed limit during cornering. After the overturn, the race kart has to recover to a state capable of running in order to continue the game. Therefore, a conventional game machine uses the following two methods. In a first method, the overturned race kart is temporally deleted from the screen. Then, the race kart in an upright state (that is, the race kart recovered from the overturn) appears from the top of the screen. Alternatively, in a second method, the entire screen is blacked out, and thereafter the race kart in an upright state is displayed in the center of the course.

Also, the game machine may perform game control for spinning the player object when the player object reaches a predetermined state during the game. For example, in the racing game, game control is performed for spinning the race kart if the race cart exceeds a speed limit during cornering. In the conventional game machine, the direction in which the spun race kart travels (that is, the orientation of the race kart) is not fixed. Therefore, the player has to determine in which direction the race kart travels based on determinations about the orientation of the spun race kart and the forward direction of the course (that is, the direction toward the goal).

The above-described conventional game machine, however, has the following problems. If the overturned race kart recovers to a state capable of running using the above-described first or second method, the screen display before the race kart is overturned is not smoothly followed by the screen display in a time period from the overturn of the race kart until the restart of the game. Thus, the player experiences an annoying sort of interruption of the racing game every time the race kart is overturned. As a result, the player is prevented from being fully absorbed in the game.

Furthermore, as aforementioned, the direction in which the spun race kart travels is not fixed. Thus, the player has to determine in which direction the race kart travels when the game is restarted. If the player makes a wrong determination when restarting the game, the race kart may travel in the reverse direction on the course.

Therefore, one feature of an exemplary embodiment of the present invention is to provide a game machine and a game program that perform processing for smoothly restarting a game after a player object is overturned or spun.

The exemplary embodiment has the following features to attain the feature mentioned above (notes in parentheses indicate exemplary elements which can be found in the embodiments to follow, though such notes are not intended to limit the scope of the invention).

A first aspect of the exemplary embodiments is directed to a game machine (composed of a main unit 1, a controller 2, a DVD-ROM 3, and a memory card 4) that executes a game program (a racing game) causing a player object (a player kart) corresponding to a player to appear in a virtual space. The game machine includes a pose control section (a CPU 10 executing step S109; hereinafter, only a step number is shown), an overturn determination section (S105), an overturn processing section (S107), and an overturn recovery section (S521-S527). The pose control section determines a pose (a pose matrix Pose) of the player object. The overturn determination section determines that the player object is to be overturned (an overturn flag is set ON at S404) if the player object is changed into a predetermined pose (it is determined YES at either S402 or S403). The overturn processing section overturns the player object (S512 and S513) if it is determined that the player object is to be overturned. The overturn recovery section controls the pose of the overturned player object and recovers the player object to a state capable of restarting the game (S522 and S523). As such, after the player object is overturned, the pose of the player object is automatically controlled so as to recover the player object to the state capable of restarting the game. As a result, the screen display before the overturn is followed in seamless manners by the screen display after the overturn until a restart of the game. Thus, the player can be fully absorbed in the game.

In this case, the game machine may further include an operation section (a controller 2) and an operation control section (S103). The operation section is operated by the player. The operation control section controls a state (for example, a traveling direction) of the player object based on an operation input (an input from a joystick 6, etc.). Furthermore, the operation control section inhibits acceptance of the operation input (it is determined YES at S102, and S103 is not executed) during a time period after the player object is overturned until it is recovered to the state capable of restarting the game. As such, the operation input from the player is not accepted during the time period after the player object is overturned until the game is restarted, whereby it is possible to automatically control the pose of the player object with ease. As a result, the screen display before the overturn is followed in seamless manners by the screen display after the overturn until a restart of the game. Thus, the player can be fully absorbed in the game.

Furthermore, the overturn recovery section may bring a direction of the player object's height (PoseY, the Y component of the pose matrix Pose) close to a direction of normal to the ground (a normal vector N of the ground) on which the player object is placed. Thus, it is possible to automatically recover the player object to an upright state.

In this case, the overturn recovery section may bring the direction of the player object's height gradually closer to the direction of being normal to the ground, and end a process for controlling the pose of the overturned player object (an overturn flag is set OFF at S527) if a difference between the direction of the player object's height and the direction of normal to the ground falls within a predetermined range (it is determined YES at S525). Thus, it is possible to naturally display the images used for recovering the player object to the state capable of restarting the game.

Alternatively, the game machine may further include a traveling direction storing section (S405). The traveling direction storing section stores a traveling direction of the pre-overturned player object if it is determined that the player object is to be overturned (it is determined YES at either S402 or S403). Furthermore, the overturn recovery section brings the traveling direction of the overturned player object (PoseZ, the Z component of the pose matrix Pose) close to the traveling direction (a pre-overturn value PPoseZ) stored in the traveling direction storing section. Thus, the orientation of the player object is automatically recovered to the pre-overturn orientation when it is recovered from the overturn state, whereby the player is allowed to continue the game smoothly without losing his/her bearings.

Particularly, the pose control section may obtain a degree of pose variation (a degree of pose variation dPose) of the player object based on an external force exerted on the player object, and control the pose of the player object based on the obtained degree of pose variation. Here, the external force is a virtual force in a virtual world, such as resistance force or frictional force, which exerts on the player object from the ground, inertia, centrifugal force, and gravitational force, and the like. In order to perform processing relating to those external forces, computing may be performed based on actual physical laws, but an artificial computing may alternatively be performed if it is not required to be performed with precision. Furthermore, the overturn processing section exerts, only during a first predetermined time period (a forced overturn time period T1), an external force (a predetermined value calculated either at S512 or S513) that causes an overturn in a direction (an overturn direction determined at S511) that the player object is to be overturned, and overturns the player object. Thus, it is possible to naturally display the images in which the player object is overturned.

More preferably, the overturn processing section may maintain an overturn state of the player object only during a second predetermined time period (a non-forced time period T2) after a lapse of the first predetermined time period without exerting the external force that causes the overturn (S512 and S513 are not executed). Thus, it is possible to naturally display the images in which the player object is overturned.

Alternatively, the game machine may execute a racing game causing a race kart, which is the player object, to run on a predetermined course. The operation control section controls at least a movement of the race kart. The pose control section determines a pose of the race kart based on at least an external force exerted on the race kart. The overturn determination section determines that the race kart is to be overturned if the race kart is changed into a predetermined pose. The overturn processing section overturns the race kart. The overturn recovery section recovers the overturned race kart to an upright state. As such, after the race kart is overturned, the pose of the race kart is automatically controlled so as to recover the race kart to the state capable of restarting the race. As a result, the screen display before the overturn is followed in seamless manners by the screen display after the overturn until a restart of the race. Thus, the player can be fully absorbed in the racing game.

A second aspect of the exemplary embodiments is directed to a game machine (composed of a main unit 1, a controller 2, a DVD-ROM 3, and a memory card 4) that executes a racing game causing a race kart to run on a predetermined course, including: an operation section (the controller 2); an operation control section (S103); a rotation determination section (S105 or S155); a traveling direction storing section (S405 or S603); a rotation processing section (S107 or S157); and a rotation recovery section (S521-S527 or S721-S725). The operation section is operated by a player. The operation control section controls at least a movement (for example, a traveling direction) of the race kart based on an operation input (an input from a joystick 6, etc.). The rotation determination section determines whether the race kart is to be rotated or not. The traveling direction storing section stores a traveling direction of the pre-rotated race kart if it is determined that the race kart is to be rotated. The rotation processing section rotates the race kart (S512 and S513, or S712 and S713) if it is determined that the race kart is to be rotated. The rotation recovery section brings a traveling direction (PoseZ, the Z component of the pose matrix Pose) of the rotated race kart close to the traveling direction (a pre-rotation value PPoseZS, a pre-overturn vale PPoseZ) stored in the traveling direction storing section. As such, the traveling direction of the rotated race kart is brought close to the pre-rotation traveling direction, whereby the player is allowed to continue the game smoothly without losing his/her bearings. Note that, in the second aspect, the term "rotate (rotation)" means both overturn and spin.

A third aspect of the exemplary embodiments is directed to a game program (a game program stored in a DVD-ROM 3) for causing a game machine (composed of a game machine 1, a controller 2, the DVD-ROM 3, and a memory card 4) to execute a game (a racing game) that causes a player object (a player kart) corresponding to a player to appear. The game program causes the game machine to execute: a pose control step (S109); an overturn determination step (S105); an overturn processing step (S107); and an overturn recovery step (S521-S527). In the pose control step, a pose of the player object (a pose matrix Pose) is determined. In the overturn determination step, it is determined that the player object is to be overturned (an overturn flag is set ON at S404) if the player object is changed into a predetermined pose (it is determined YES at S402 or S403). In the overturn processing step, the player object is overturned (S512 and S513) if it is determined that the player object is to be overturned. In the overturn recovery step, the pose of the overturned player object is controlled and the player object is recovered to a state capable of restarting the game (S522 and S523). As such, after the player object is overturned, the pose of the player object is automatically controlled so as to recover the player object to the state capable of restarting the game. As a result, the screen display before the overturn is followed in seamless manners by the screen display after the overturn until a restart of the game. Thus, the player can be fully absorbed in the game.

In this case, the game program may further include an operation input step (S301) and an operation control step (S302-S307 of S103). In the operation input step, an operation input (an input from a joystick 6, etc.) is received from an operation section (the controller 2) operated by the player. In the operation control step, a state (for example, a traveling direction) of the player object is controlled based on the operation input. Furthermore, in the operation control step, acceptance of the operation input is inhibited during a time period after the player object is overturned until it is recovered to the state capable of restarting the game (it is determined YES at S102, and S103 is not executed). As such, the operation input from the player is not accepted during the time period after the player object is overturned until the game is restarted, whereby it is possible to automatically control the pose of the player object with ease. As a result, the screen display before the overturn is followed in seamless manners by the screen display after the overturn until a restart of the game. Thus, the player can be fully absorbed in the game.

Furthermore, in the overturn recovery step, the direction of the player object's height (PoseY, the Y component of the pose matrix Pose) may be brought close to a direction of a normal to a ground (a normal vector N of the ground) on which the player object is placed. Thus, it is possible to automatically recover the player object to an upright state.

In this case, in the overturn recovery step, the direction of the player object's height may be brought gradually closer to the direction of the normal, and a process for controlling the pose of the overturned player object may be ended (an overturn flag is set OFF at S527) if a difference between the direction of the player object's height and the direction of the normal falls within a predetermined range (it is determined YES at S525). Thus, it is possible to naturally display the images used for recovering the player object to the state capable of restarting the game.

Alternatively, the game program may further include a traveling direction storing step (S405). In the traveling direction storing step, a traveling direction of the pre-overturn player object is stored if it is determined that the player object is to be overturned (it is determined YES at S402 or S403). Furthermore, in the overturn recovery step, the traveling direction (PoseZ, the Z component of the pose matrix Pose) of the overturned player object is brought close to the traveling direction (a pre-overturn value PPoseZ) stored at the traveling direction storing step, whereby the player is allowed to continue the game smoothly without losing his/her bearings.

Particularly, in the pose control step, a degree of pose variation (a degree of pose variation dPose) of the player object may be obtained based on an external force exerted on the player object, and the pose of the player object may be controlled based on the obtained degree of pose variation. Furthermore, in the overturn processing step, only during a first predetermined time period (a forced overturn time period T1), an external force (a predetermined value calculated at either S512 or S513) that causes an overturn is exerted in a direction (a direction determined at S511) that the player object is to be overturned, and the player object is overturned. Thus, it is possible to naturally display the images in which the player object is overturned.

More preferably, in the overturn processing step, an overturn state of the player object may be maintained during only a second predetermined time period (a non-forced overturn time period T2) after a lapse of the first predetermined time period without exerting the external force (S512 and S513 are not executed) that causes the overturn. Thus, it is possible to naturally display the images in which the player object is overturned.

Alternatively, the game program may be a game program that causes a game machine to execute a racing game causing a race kart, which is the player object, to run on a predetermined course. In the operation control step, at least a movement of the race kart is controlled. In the pose control step, a pose of the race kart is determined based on at least an external force exerted on the race kart. In the overturn determination step, it is determined that the race kart is to be overturned if the race kart is changed into a predetermined pose. In the overturn processing step, the race kart is overturned. In the overturn recovery step, the overturned race kart is recovered to an upright state. As such, after the race kart is overturned, the pose of the race kart is automatically controlled so as to recover the race kart to the state capable of restarting the race. As a result, the screen display before the overturn is followed in seamless manners by the screen display after the overturn until a restart of the race. Thus, the player can be fully absorbed in the game.

A fourth aspect of the exemplary embodiments is directed to a game program (a game program stored in a DVD-ROM 3) that causes a game machine (composed of a main unit 1, a controller 2, the DVD-ROM 3, and a memory card 4) to execute a racing game causing a race kart to run on a predetermined course. The game program causes the game machine to execute: an operation input step (S301); an operation control step (S302-S307 of S103); a rotation determination step (S105 or S155); a traveling direction storing step (S405 or S603); a rotation processing step (S107 or S157); and a rotation recovery step (S521-S527 or S721-S725). In the operation input step, an operation input (an input from a joystick 6, etc.) is received from an operation section (the controller 2) operated by a player. In the operation control step, at least a movement (for example, a traveling direction) of the race kart is controlled based on the operation input. In the rotation determination step, it is determined whether the race kart is to be rotated or not. In the traveling direction storing step, a traveling direction of the pre-rotated race kart is stored if it is determined that the race kart is to be rotated. In the rotation processing step, the race kart is rotated (S512 and S513, or S712 and S713) if it is determined that the race kart is to be rotated. In the rotation recovery step, a traveling direction (PoseZ, the Z component of the pose matrix Pose) of the rotated race kart is brought close to the traveling direction (a pre-rotation value PPoseZS, a pre-overturn value PPoseZ) stored at the traveling direction storing step. As such, the traveling direction of the rotated race kart is brought close to the pre-rotation traveling direction, whereby the player is allowed to continue the game smoothly without losing his/her bearings. Note that, in the fourth aspect, the term "rotate (rotation)" means both overturn and spin.

These and other features, aspects and advantages of the exemplary embodiments will become more apparent from the following detailed description of the example embodiments of the present invention when taken in conjunction with the accompanying drawings.

BRIEF DESCRIPTION OF THE DRAWINGS

FIG. 4 is an illustration showing the kart data structure of the game machine according to the example embodiments of the present invention;

FIGS. 11A and 11B are illustrations showing a status of an overturned kart in the game machine according to the first example embodiment of the present invention;

FIG. 15 is a flowchart showing a spin process of the game machine according to the second example embodiment of the present invention.

DESCRIPTION OF THE PREFERRED EMBODIMENTS

Figure 1:
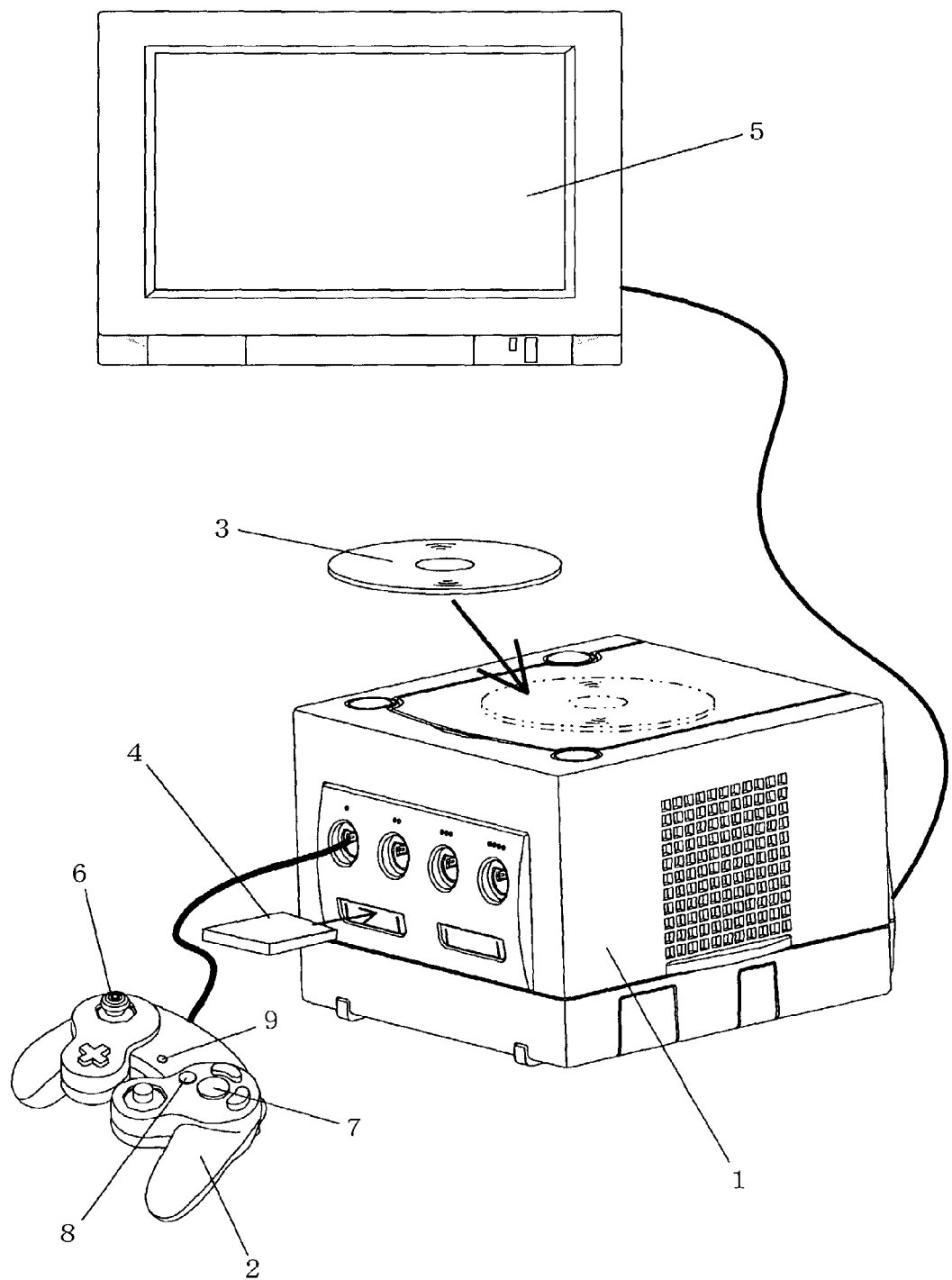
FIG. 1 is an external view of a game system including a game machine according to example embodiments of the present invention.

FIG. 1 is an external view of a game system including a game machine according to the exemplary embodiments of the present invention. The exemplary game system shown in FIG. 1 includes a main unit 1, a controller 2, a DVD-ROM 3, a memory card 4, and a television 5. In the following embodiment, the above-described elements except television 5 collectively correspond to a game machine.

The DVD-ROM 3 and the memory card 4 can be removably mounted on or inserted into the main unit 1, respectively. The controller 2 and the television 5 are connected to the main unit 1 by a communication cable. The main unit 1 is provided with a plurality of connectors for connecting the controller 2 to other devices, and the controller 2 is connected to any one of the plurality of connectors. Note that the main unit 1 and the controller 2 may communicate with each other via radio waves in place of the communication cable.

The DVD-ROM 3 fixedly stores data necessary to play a game, such as a game program and image data or the like. When a player plays the game, the DVD-ROM 3 is mounted on the main unit 1. The memory card 4 is a rewritable storage medium. Various data related to the game is stored in the memory card 4 in order to save a current state of the game. Note that other storage media may be used in place of the DVD-ROM 3 in order to store the game program, etc.

The main unit 1 reads the game program stored in the DVD-ROM 3, and performs game processing. The controller 2 is an input device of the game machine. The controller 2 is provided with a plurality of operation switches such as a joystick 6, an A button 7, a B button 8, and a start button 9 or the like, and outputs an operation input to the main unit 1 in response to the pressure of the operation switches exerted by the player, or the like. The television 5 displays an image signal output from the main unit 1 on the screen. Also, the television 5 has a built-in loud speaker. An audio signal from the main unit 1 is output from the loud speaker of the television 5.

Figure 2:
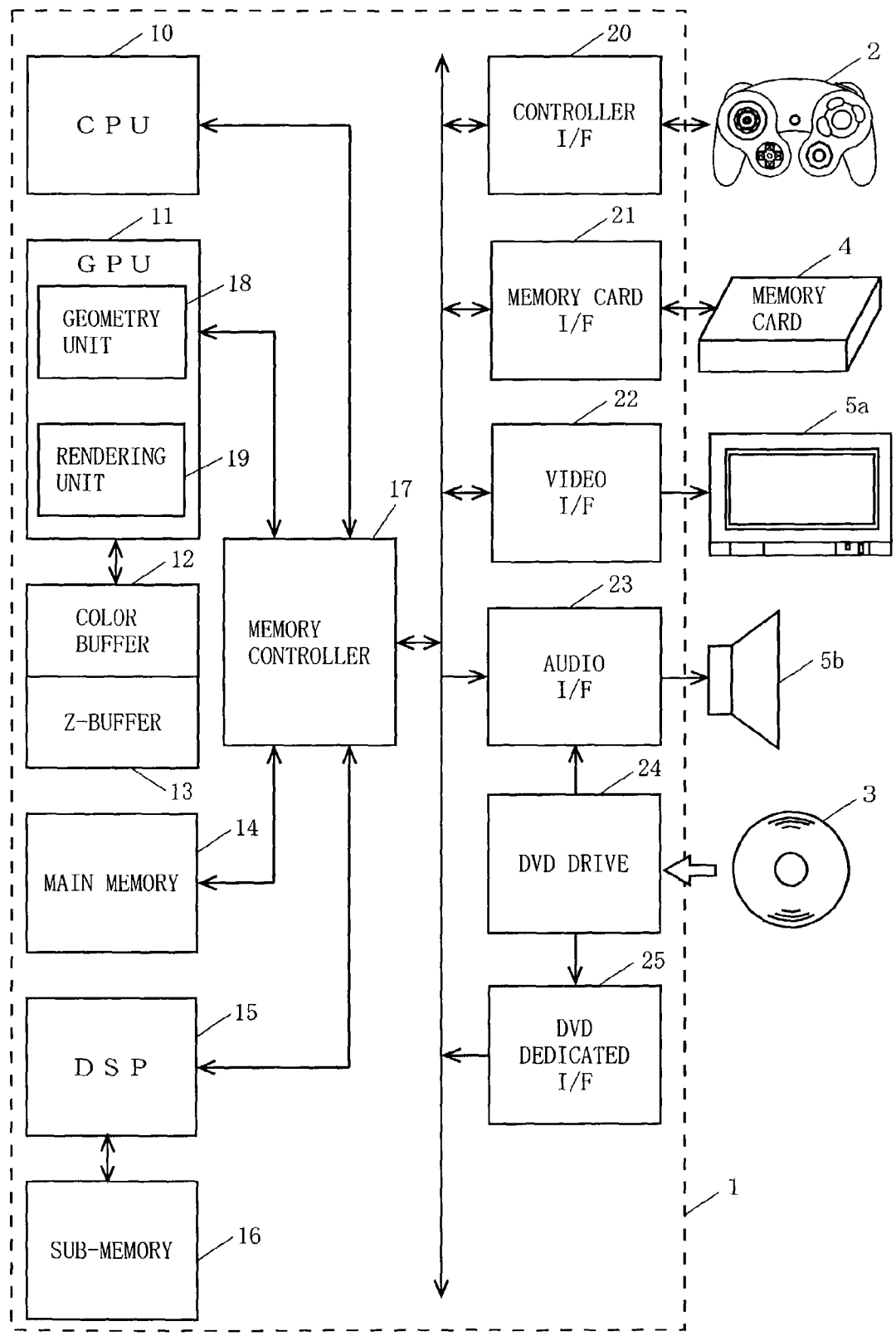
FIG. 2 is a block diagram illustrating the hardware structure of the game machine according to the example embodiments of the present invention.

FIG. 2 is a block diagram illustrating the hardware structure of the game machine shown in FIG. 1. In FIG. 2, the main unit 1 includes a computing section (a CPU 10, a graphics processing unit (GPU) 11, and a digital signal processor (DSP) 15), a storage section (a main memory 14, a color buffer 12, a Z-buffer 13, and a sub-memory 16), various interface (I/F) sections (20 to 23, and 25), a memory controller 17, and a DVD drive 24. As shown in FIG. 2, the memory controller 17 interconnects the computing section, the storage section, and the interface section, and controls data transfer between the sections described above.

The DVD-drive 24 drives the DVD-ROM 3 mounted on the main unit 1. A game program, etc., is stored in the DVD-ROM 3. The game program stored in the DVD-ROM 3 is loaded into the main memory 14 via a DVD dedicated I/F 25 and the memory controller 17. The CPU 10 executes the game program loaded into the main memory 14. During the game, the player operates the joystick 6 of the controller 2 or presses the A button 7, for example. In response to those operations by the player, the controller 2 outputs the operation input to the main unit 1. The operation input from the controller 2 is input into the CPU 10 via a controller I/F 20 and the memory controller 17. In response to the operation input from the controller 2, the CPU 10 performs predetermined game processing.

The GPU 11 mainly performs a process for generating image data in accordance with control from the CPU 10. The GPU 11, including a geometry unit 18 and a rendering unit 19, is connected to a memory dedicated to image processing (the color buffer 12 and the Z-buffer 13). Note that a portion of the main memory 14 may be allocated to the image processing as a dedicated area in place of a memory dedicated to image processing. The geometry unit 18 and the rendering unit 19 are circuits for performing processing of three-dimensional computer graphics. The geometry unit 18 performs processing for determining a position (a position in a game space, which is represented by three-dimensional coordinates) of an object in a virtual three-dimensional space. The rendering unit 19 performs processing for generating two-dimensional image to be displayed on the television 5 based on the three-dimensional coordinates obtained by the geometry unit 18. The color buffer 12 stores the two-dimensional image generated by the rendering unit 19, and the Z-buffer 13 stores information on depth of the three-dimensional computer graphics. With the above-described elements, the GPU 11 generates image data to be displayed on the television 5, and outputs appropriately the generated image data to the television 5 via the memory controller 17 and a video I/F 22.

The DSP 15 mainly performs processing for generating audio data in accordance with control from the CPU 10. The sub-memory 16 is a working memory of the DSP 15. The audio data generated by the DSP 15 is output to a loud speaker 5b of the television 5 via the memory controller 17 and an audio I/F 23. Note that the audio signal output from the main unit 1 may be output from a loud speaker that is not built into the television 5.

Figure 3:
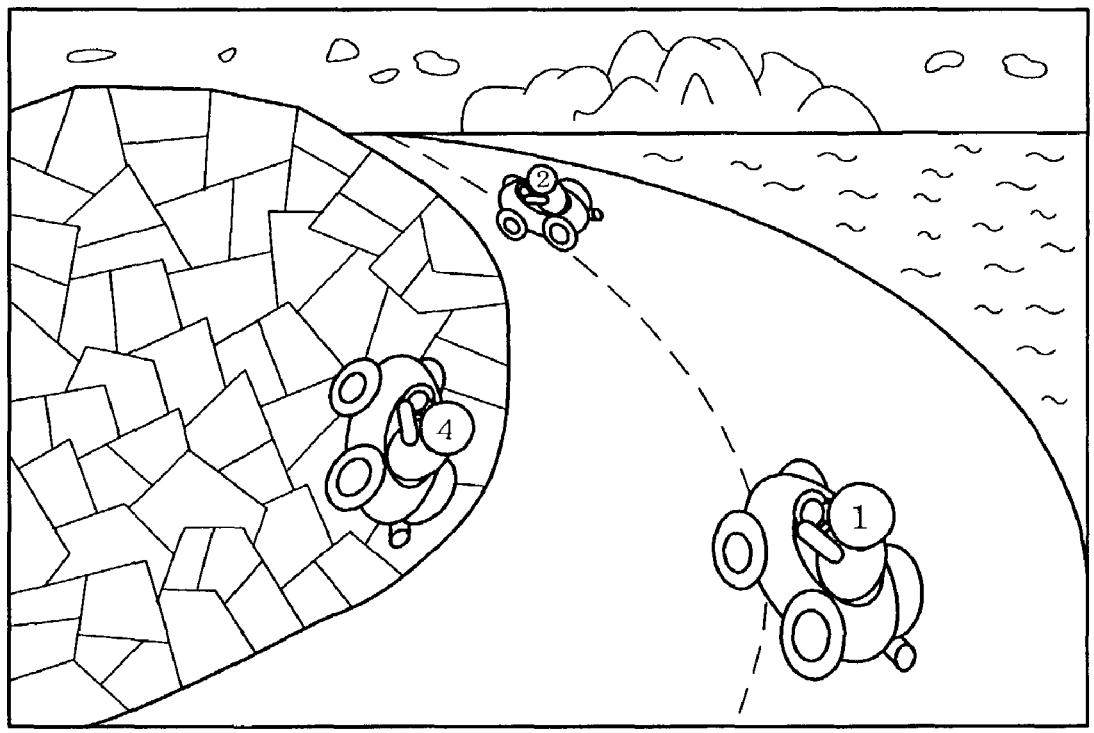
FIG. 3 is an illustration of an exemplary display screen of the game machine according to the example embodiments of the present invention.

Hereinafter, the case in which a racing game is executed in the game machine shown in FIGS. 1 and 2 is described. The game program used for causing the game machine to execute the racing game is fixedly stored in the DVD-ROM 3. In accordance with the game program stored in the DVD-ROM 3, the main unit 1 changes a state of a race kart during the game depending on the operation input from the controller 2, and causes the television 5 to display the running race kart. The television 5 displays, for example, a screen shown in FIG. 3.

In this racing game, one or more race karts appear in the game space. Note that the number of the race karts corresponds to the number of players. Each player uses the controller 2 for operating his/her race kart on a three-dimensional course set in the game space in order to achieve high ranking in a kart race. The maximum number of players who can join the racing game at any one time corresponds to the number of controllers 2 that can be concurrently connected to the main unit 1. Furthermore, some race karts (hereinafter, referred to as rival karts) whose running states are automatically controlled by the game program also join the race along with the race kart (hereinafter, referred to as a player kart) operated by the player. In this racing game, the player kart corresponds to a player object.

A movement and a pose of the player kart are determined by external forces exerted on the player kart. Here, the external forces are virtual external forces in a virtual game world, such as resistance force or frictional force, which exerts on the player kart from the ground, inertia, centrifugal force, and gravitational force, and the like. For example, if the course is tilted from a horizontal plane, the player kart experiences non-vertical reaction force, thereby taking a pose inclined from the horizontal plane. Furthermore, if the player kart crashed into a wall, the player kart experiences a reaction force from the wall, thereby being bounced back. Still further, the player kart running outside of the road experiences greater frictional force compared to that exerted on the player kart running on the road, and is thereby prevented from traveling at the same speed. Also, if the player kart turns a corner at a given speed, the player kart experiences centrifugal force pushing it to the outside of the corner and becomes inclined outward. In order to perform processing relating to those external forces, computing may be performed based on actual physical laws, but an artificial computing may alternatively be performed if it is not required to be performed with precision.

The movement and the pose of the player kart are also controlled by the operation input from the controller 2. The joystick 6 of the controller 2 corresponds to a steering wheel of the player kart. The player changes the traveling direction of the player kart by tilting the joystick 6 in an appropriate direction. In accordance with an embodiment, the A button 7 of the controller 2 corresponds to an accelerator of the player kart, and the B button 8 corresponds to a brake of the player kart. The player increases or decreases speed of the player kart by pressing the A button 7 or the B button 8, respectively, depending on circumstances.

The movement and the pose of the player kart are managed using kart data shown in FIG. 4. The kart data shown in FIG. 4 includes a position P, a speed V, acceleration A, a pose matrix Pose, and a degree of pose variation dPose. The kart data may include data other than the data shown in FIG. 4.

The movement of the player kart is managed using the position P, the speed V, and the acceleration A. The position P, the speed V, and the acceleration A represent a position of the player kart in the three-dimensional space, a speed vector therein, and an acceleration vector therein, respectively, by using a world coordinate system used for representing the course. The speed V and the acceleration A represent a speed and acceleration per time (1 frame time) required for outputting one frame of the image data, respectively.

Figure 5:
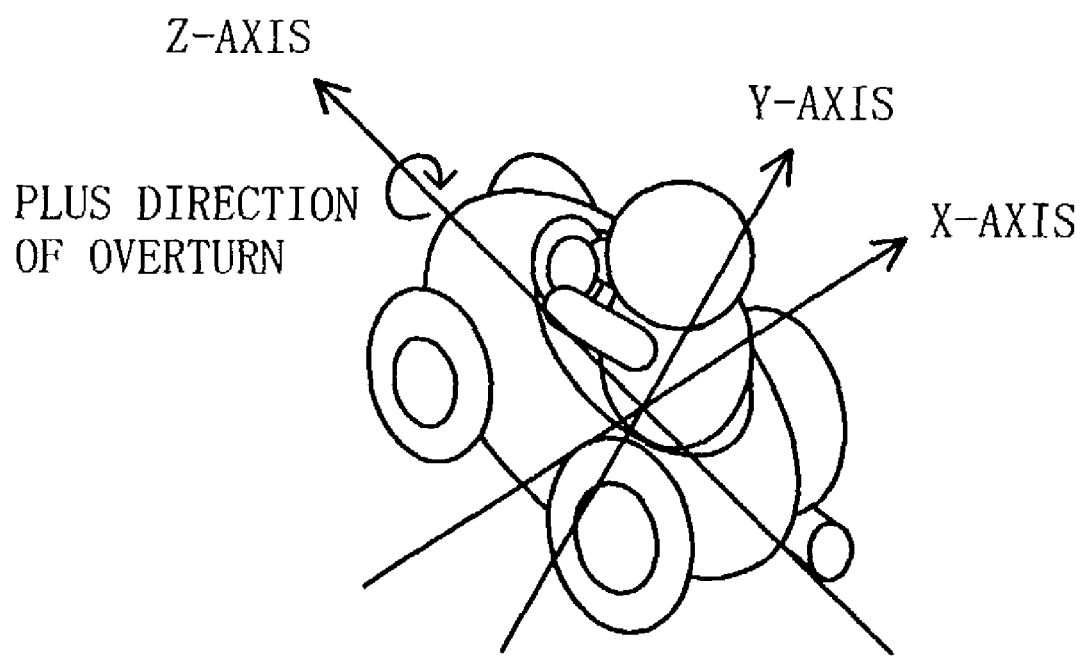
FIG. 5 is an illustration showing a kart coordinate system of the game machine according to example embodiments of the present invention.

The pose of the player kart is managed using the pose matrix Pose and the degree of pose variation dPose. In order to represent the pose of the player kart, a kart coordinate system (a local coordinate system) shown in FIG. 5 is defined for the player kart. The Z-axis of the kart coordinate system corresponds to the traveling direction of the player kart. The Y-axis of the kart coordinate system corresponds to the direction of the player kart's height. The X-axis of the kart coordinate system corresponds to the side-to-side direction of the player kart, which extends in a direction perpendicular to the Y-axis and the Z-axis.

The pose matrix Pose is structured by three vectors: PoseX, PoseY, and PoseZ. PoseX, PoseY, and PoseZ are each three-dimensional vector, and represent direction vectors of the above-described X-axis, Y-axis, and Z-axis of the kart coordinate system, respectively, by the world coordinate system.

The degree of pose variation dPose represents a degree of pose variation of the player kart per frame time by rotation angles about the three coordinate axes of the kart coordinate system. More specifically, the degree of pose variation dPose is structured by three components: dPosex, dPosey, and dPosez. The first component dPosex represents an angle at which the player kart rotates about the X-axis of the kart coordinate system per frame time. The second component dPosey represents an angle at which the player kart rotates about the Y-axis of the kart coordinate system per frame time. The third component dPosez represents an angle at which the player kart rotates about the Z-axis of the kart coordinate system per frame time. In order to represent each component of the degree of pose variation dPose by a rotation angle about each corresponding axis, the clockwise direction in the case of setting the point of view at an origin of the kart coordinate system and viewing toward the positive direction of each coordinate axis is assumed to be a plus direction (see FIG. 5).

The movement and the pose of the player kart have been described in the above description. Movements and poses of the rival karts, on the other hand, are controlled automatically by the program stored in the DVD-ROM 3 independently of the operation of the controller 2 by the player.

Figure 6:
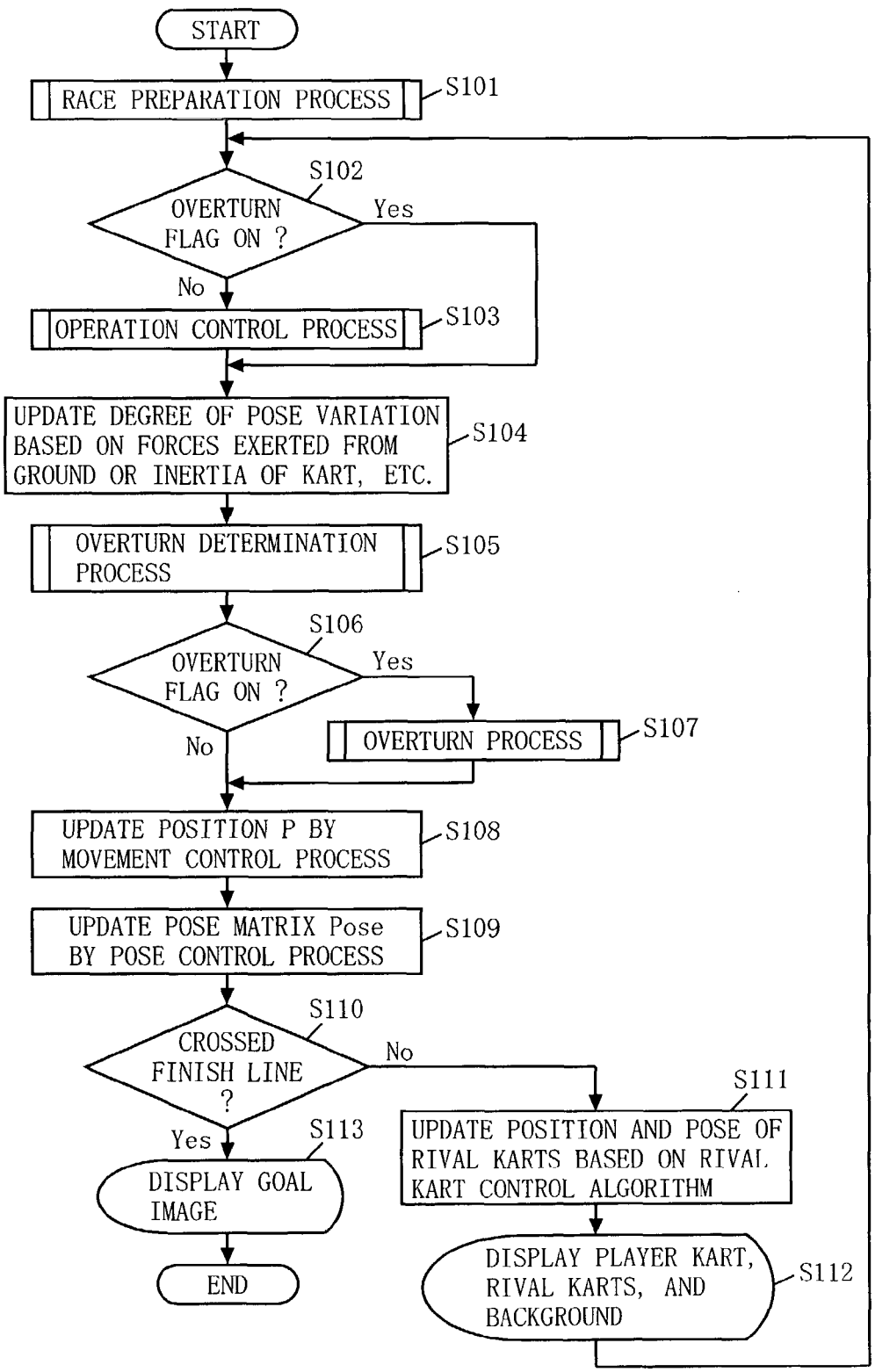
FIG. 6 is a flowchart showing a main process of the game machine according to a first example embodiment of the present invention.

With reference to FIGS. 6 to 10, an operation of the game machine according to a first embodiment is described below in detail. In the first embodiment, a game performing an overturn process when the player kart is changed into a predetermined state is described. FIG. 6 is a flowchart showing a main process of the game machine. FIGS. 7 to 10 are flowcharts of subroutines invoked by the main process shown in FIG. 6. The game machine executes the process shown in FIGS. 6 to 10 for every execution of the racing game. Those game processes are performed when the CPU 10 executes the game program stored in the DVD-ROM 3. Note that a case where the number of players is one (that is, the number of player karts is one) will be described below, but the process relating to the player kart may be performed a plurality of times if there is a plurality of players.

Figure 7:
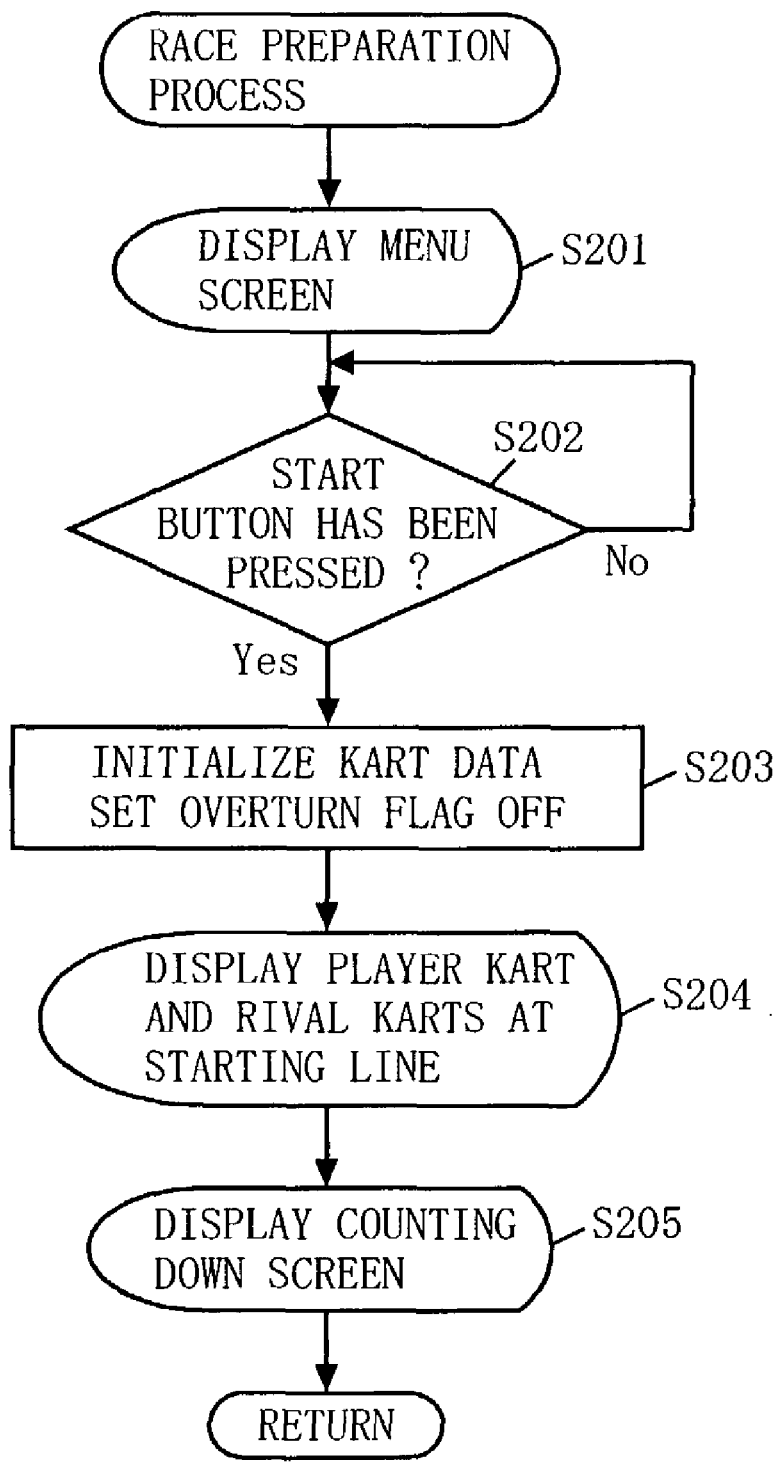
FIG. 7 is a flowchart showing a race preparation process of the game machine according to the first example embodiment of the present invention.

As shown in FIG. 6, the CPU 10 executes a race preparation process before the race is started (step S101). FIG. 7 is a flowchart showing details of the race preparation process (step S101). In the race preparation process, the CPU 10 causes a menu screen of the racing game to be displayed (step S201), and waits until the start button 9 of the controller 2 is pressed (step S202). Once the start button 9 is pressed, the CPU 10 is restored from the waiting state, and initializes the kart data shown in FIG. 4 (step S203). In this step, the CPU 10 sets an overturn flag OFF (non-overturn state). The overturn flag indicates whether the player kart is overturned or not. Then, the CPU 10 causes the player kart and the rival karts to be displayed at the starting line (step S204). The CPU 10 then performs a countdown display (step S205). More specifically, the CPU 10 causes the screens each containing a numerical character "3", "2", and "1", and a word "START" to be displayed sequentially per second for informing the player when the race is started. When the countdown display is completed, the CPU 10 ends the race preparation process, and returns to the main process.

After the race preparation process, the CPU 10 performs the processes from steps S102 to S112 per frame time until determining that the player kart has crossed the finish line. The position and the pose of the player kart are updated by the processes from step S102 to S109, and the position and the pose of the rival karts are updated by the process at step S111. At step S112, the player kart, the rival karts, and a background are displayed on the screen. Details of each step are described below.

The CPU 10 determines whether the overturn flag is ON (overturn state) or not (step S102). If the overturn flag is OFF, the CPU 10 executes an operation control process for updating the kart data based on the operation input from the controller 2 (step S103). On the other hand, if the overturn flag is ON, the CPU 10 does not execute the operation control process. This means that the game machine accepts the operation input when the player kart is not overturned, but ignores it when the player kart is overturned. That is, the game machine inhibits acceptance of the operation input from the controller 2 when the player kart is overturned.

Figure 8:
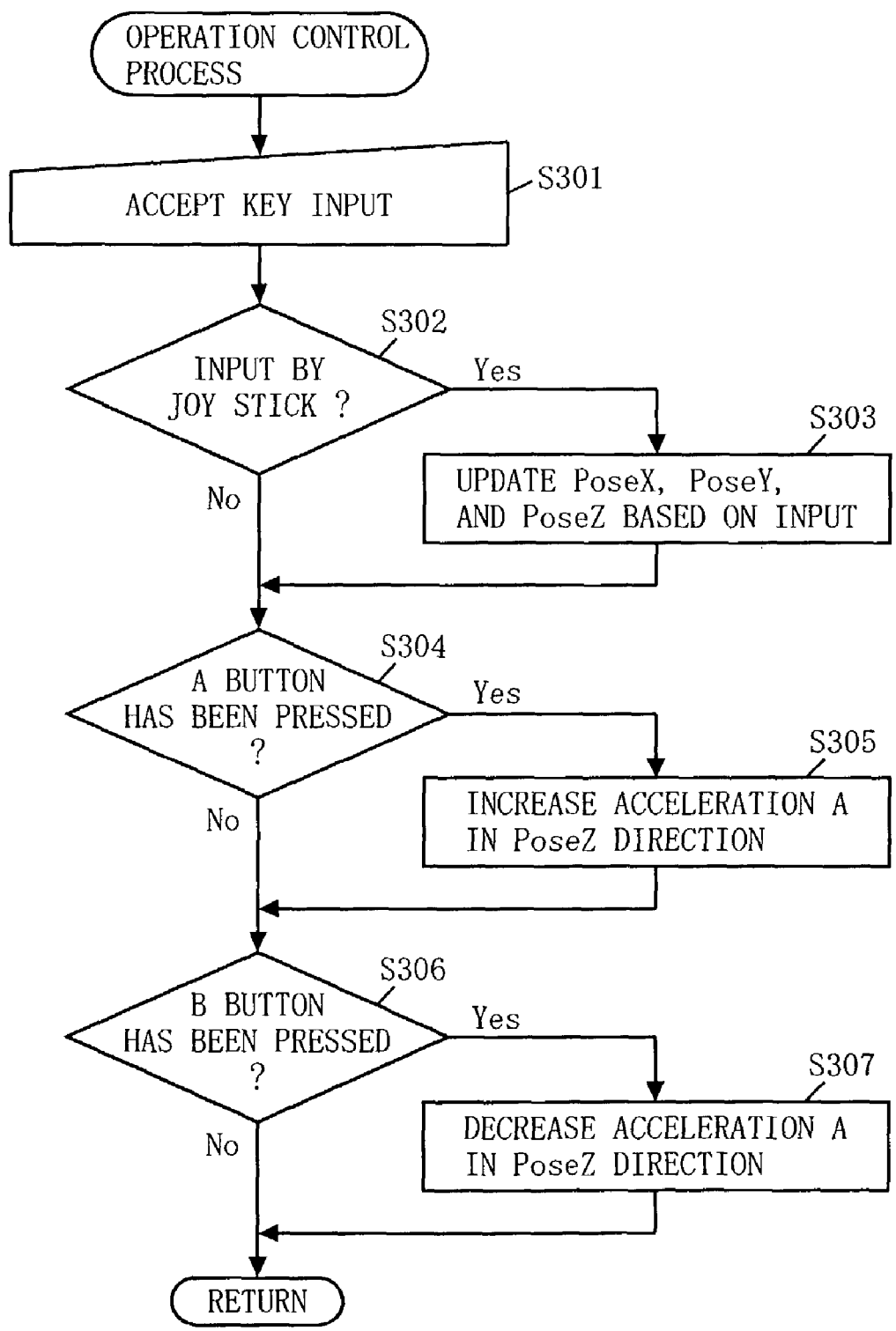
FIG. 8 is a flowchart showing an operation control process of the game machine according to the first example embodiment of the present invention.

FIG. 8 is a flowchart showing details of the operation control process (step S103). As aforementioned, in the racing game, the joystick 6, the A button 7, and the B button 8 correspond to the steering wheel, the accelerator, and the brake of the player kart, respectively. In the operation control process, the CPU 10 accepts the operation input from the controller 2 (step S301). Then, the CPU 10 determines whether there is an input from the joystick 6 or not (step S302). If there is an input from the joystick 6, the CPU 10 updates the pose matrix Pose of the kart data according to the input (step S303). More specifically, the CPU 10 updates the three vectors PoseX, PoseY, and PoseZ included in the pose matrix Pose according to the tilting direction of the joystick 6.

Then, the CPU 10 determines whether the A button 7 is pressed or not (step S304). If the A button 7 is pressed, the CPU 10 increases the acceleration A of the kart data in the traveling direction of the player kart (step S305). The CPU 10 then determines whether the B button 8 is pressed or not (step S306). If the B button 8 is pressed, the CPU 10 decreases the acceleration A in the traveling direction of the player kart. Note that the direction of the vector PoseZ included in the pose matrix Pose corresponds to the traveling direction of the player kart. Thus, the CPU 10 increases the acceleration A in the PoseZ direction at step S305, and decreases the acceleration A in the PoseZ direction at step S307. Then, the CPU 10 ends the operation control process, and returns to the main process.

After the operation control process, the CPU 10 updates the degree of pose variation dPose of the kart data based on the external forces exerted on the player kart (step S104). In this process, for example, the degree of pose variation dPose of the kart data is updated based on the forces exerted from the ground or the inertia of the kart. In this process, it is sufficient to cause the player kart to perform a pose change in seamless manners to be displayed as a game image. Thus, actual calculation of the external forces is unnecessary, and strict calculation thereof based on the actual physical laws is also unnecessary. Note that the external forces may be calculated based on the actual physical laws. It is sufficient if the factor of the external forces (for example, the direction of the normal to the ground, a coefficient of friction of the ground, and speed of the player kart, or the like) naturally corresponds to the pose change of the player kart caused by the above-described factor.

Then, the CPU 10 performs an overturn determination process (step S105), and determines again whether the overturn flag is ON or not (step S106). If the overturn flag is ON, the CPU 10 executes the overturn process (step S107). On the other hand, if the overturn flag is OFF, the CPU 10 does not execute the overturn process. Details of the overturn determination process and the overturn process will be described further below.

Then, the CPU 10 executes a movement control process (step S108) and a pose control process (step S109). In the movement control process, the CPU 10 updates the position P of the kart data based on the speed V and the acceleration A of the kart data. In the pose control process, the CPU 10 generates a pose variation matrix MdPose based on the degree of pose variation dPose of the kart data by the following equation (1), updates the pose matrix Pose of the kart data based on the generated pose variation matrix MdPose by the following equation (2), and normalizes the pose matrix Pose.

$$MdPose = \begin{pmatrix} 1 & 0 & 0 \\ 0 & \cos(dPosex) & \sin(dPosex) \\ 0 & -\sin(dPosex) & \cos(dPosex) \end{pmatrix} \times \begin{pmatrix} \cos(dPosey) & 0 & -\sin(dPosey) \\ 0 & 1 & 0 \\ \sin(dPosey) & 0 & \cos(dPosey) \end{pmatrix} \times \begin{pmatrix} \cos(dPosez) & \sin(dPosez) & 0 \\ -\sin(dPosez) & \cos(dPosez) & 0 \\ 0 & 0 & 1 \end{pmatrix} \quad (1)$$

$$Pose = Pose + Pose \times MdPose \quad (2)$$

The CPU 10 then determines whether the player kart has crossed the finish line or not (step S110). If the player kart has crossed the finish line, the CPU 10 proceeds to step S113. In this case, the CPU 10 causes a goal image representing the race results, etc., to be displayed (step S113), and ends the process for one racing game.

On the other hand, if the player kart has not crossed the finish line, the CPU 10 proceeds to step S111. In this case, the CPU 10 updates the positions and the poses of the rival karts based on a rival kart control algorithm (step S111). Then, the CPU 10 causes the screen showing a status of the race, which includes the player kart, the rival karts, and the background, to be displayed (step S112). When the screen is caused to be displayed, the position of the player kart determined by the movement control process (step S108) and the pose thereof determined by the pose control process (step S109) are referred to in order to display the player kart on the screen. After displaying the screen showing a status of the race, the CPU 10 goes back to step S102. Thereinafter, the CPU 10 repeatedly executes the processes from steps S102 to S112 until determining that the player kart has crossed the finish line at step S110. By repeatedly executing the above-described process, the screens showing a status of the race are sequentially displayed until the player kart has crossed the finish line.

Figure 9:
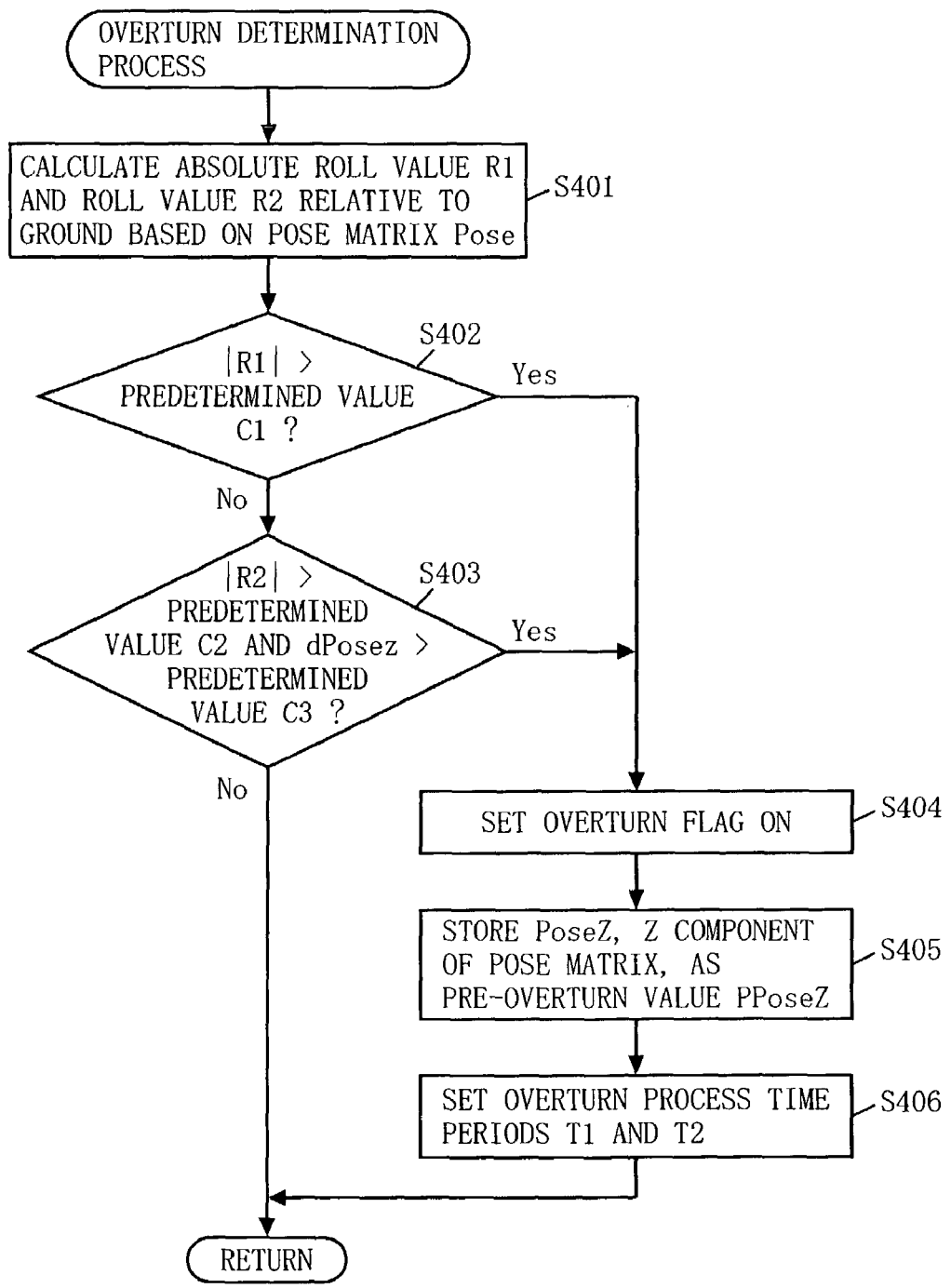
FIG. 9 is a flowchart showing an overturn determination process of the game machine according to the first example embodiment of the present invention.

FIG. 9 is a flowchart showing details of the overturn determination process (step S105). In the overturn determination process, it is determined that the player kart is overturned when the player kart is changed into a predetermined state. In the overturn determination process, the CPU 10 calculates an absolute roll value R1 and a roll value R2 relative to the ground based on the pose matrix Pose (step S401). Here, the absolute roll value R1 corresponds to an angle between the horizontal plane of the world coordinate system and the X-axis of the player kart, and is calculated by the following equation (3).

$$R1 = \arctan\{PoseXy/\sqrt{(PoseXx)^2 + (PoseXz)^2}\} \quad (3)$$

The roll value R2 relative to the ground corresponds to the difference between the angle of the ground on which the player kart is placed and the absolute roll value R1. The greater the absolute roll value R1, or the greater the roll value R2 relative to the ground, the more heavily the player kart becomes tilted from the horizontal plane, that is, the more likely the player kart is to be overturned.

Then, the CPU 10 compares the absolute value R1 with a first predetermined value C1 (step S402). If the absolute value of the absolute roll value R1 is greater than the first predetermined value C1, the CPU 10 proceeds to step S404. If the absolute value of the absolute roll value R1 is equal to or smaller than the first predetermined value C1, the CPU 10 determines whether the following two conditions are satisfied. The first condition is the absolute value of the roll value R2 relative to the ground is greater than a second predetermined value C2. The second condition is dPosez, the Z component of the degree of pose variation dPose, is greater than a third predetermined value C3 (step S403). When it is determined that the above-described two conditions are satisfied, the CPU 10 proceeds to step S404.

After proceeding to step S404, the CPU 10 sets the overturn flag ON (step S404). Next, the CPU 10 stores PoseZ, the Z component of the current pose matrix Pose, as a pre-overturn value PPoseZ (step S405). The pre-overturn value PPoseZ is referred to at step S523 in the overturn process described further below. Then, the CPU 10 sets two time periods, a time period T1 (forced overturn time period) and a time period T2 (non-forced overturn time period), which are necessary for the overturn process (step S406). Among the above-described two time periods, the forced overturn time period T1 represents a time period in which the player kart is forcedly rolled over by the external forces, and the non-forced overturn time period T2 represents a time period in which the player kart is rolled over by inertia without experiencing the external forces after a lapse of the forced overturn time period T1. Note that, as the forced overturn time period T1 and the non-forced overturn time period T2, appropriate values (fixed values) are set so that the player kart is overturned in natural manners as a game image, for example. In place of the appropriate values, appropriate functions may be set. After step S403 or step S406, the CPU 10 ends the overturn determination process, and returns to the main process.

As described above, in the overturn determination process, if the player kart is more tilted compared to a predetermined angle, the overturn flag is set ON, the pre-overturn value PPoseZ is stored, and the time periods T1 and T2 for overturn process are set. On the other hand, if the player kart is not more tilted compared to a predetermined angle, the above-described processes are not performed. Thus, the overturn flag and the pre-overturn value PPoseZ maintain the previous values.

Figure 10:
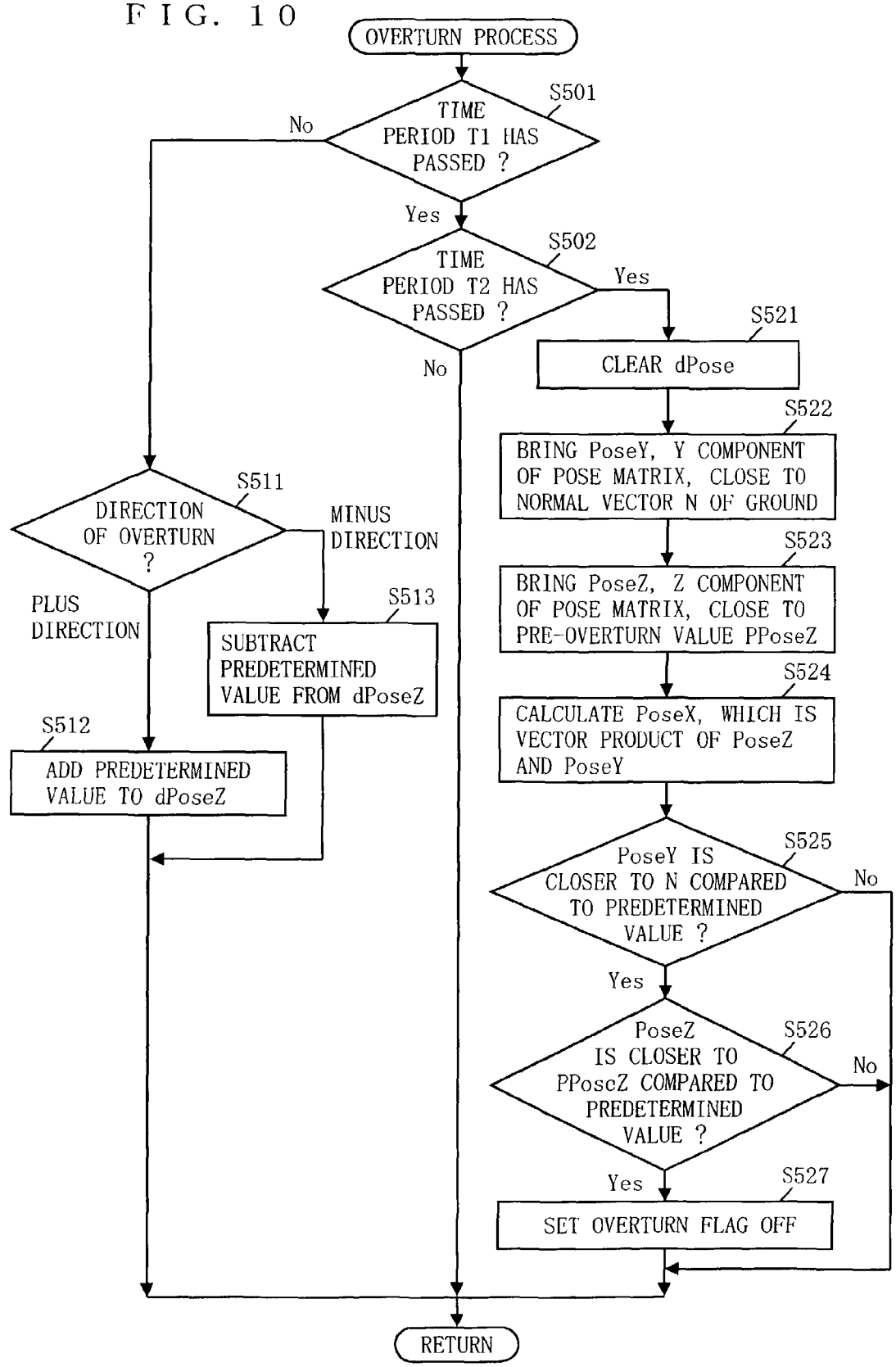
FIG. 10 is a flowchart showing an overturn process of the game machine according to the first example embodiment of the present invention.
Figure 12A:
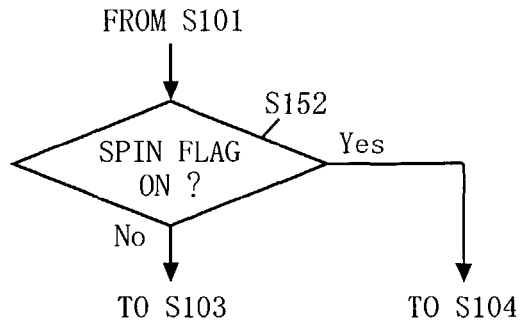
FIGS. 12A and 12B are flowcharts showing a main process of the game machine according to a second example embodiment of the present invention.
Figure 12B:
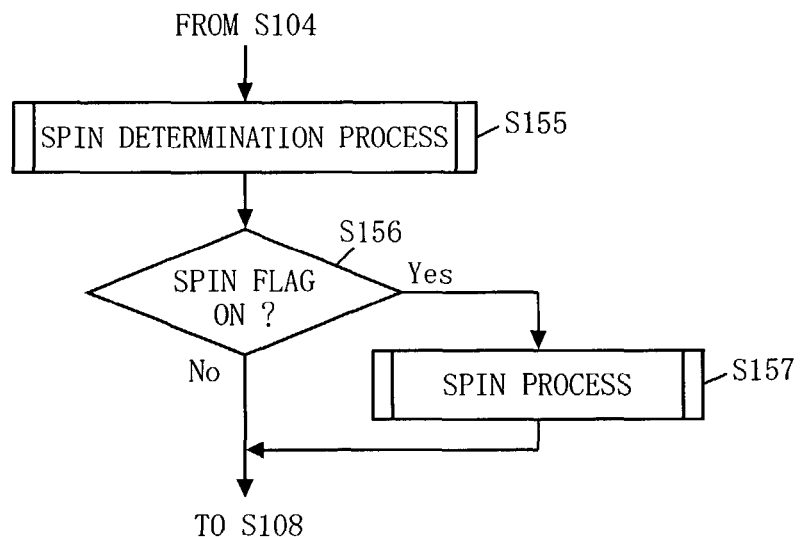

FIG. 10 is a flowchart showing details of the overturn process (step S107). The overturn process is performed based on how much time has passed after it is determined that the player kart is overturned. That is, three different processes are performed corresponding to the following three different time periods: 1) a time period until the end of the forced overturn time period T1, 2) a time period from the end of the forced overturn time period T1 until the end of the non-forced overturn time period T2, and 3) a time period after the non-forced overturn time period T2. The above-described three time periods are referred to as a first time period, a second time period, and a third time period, respectively, and details of the process performed in each time period are described below.

As described above, the CPU 10 determines how much time has passed after it is determined at steps S501 and S502 that the player kart is overturned in the overturn process. That is, the CPU 10 determines whether the forced overturn time period T1 has passed or not (step S501). If the forced overturn time period T1 has passed, the CPU 10 proceeds to step S502, and if the forced overturn time period T1 has not passed, the CPU 10 proceeds to step S511. At step S502, the CPU 10 determines whether the non-forced overturn time period T2 has passed or not. If the non-forced overturn time period T2 has passed, the CPU 10 proceeds to step S521. If it is determined that the non-forced overturn time period T2 has not passed at step S502 (that is, during the above-described second time period), the CPU 10 ends the overturn process without performing any processing, and returns to the main process. As a result, when screen display is performed until the end of the non-forced overturn time period T2 after the forced overturn time period T1, the value of the degree of pose variation dPose updated at step S104 is used as it is in the pose control process (step S109).

On the other hand, if it is determined that the forced overturn time period T1 has not passed at step S501 (that is, during the above-described first time period), the CPU 10 determines whether the overturn direction is in a plus direction or in a minus direction (step S511). Specifically, the overturn direction in which the absolute roll value R1 or the roll value R2 relative to the ground is positive is a plus direction, and the overturn direction in which the absolute roll value R1 or the roll value R2 relative to the ground is negative is a minus direction. If the overturn direction is in a plus direction, the CPU 10 adds a predetermined value to dPosez, the Z component of the degree of pose variation dPose (step S512). On the other hand, if the overturn direction is in a minus direction, the CPU 10 subtracts a predetermined value from dPosez, the Z component of the degree of pose variation dPose (step S513). As such, during the above-described first time period, a predetermined value is added to or subtracted from dPosez, the Z component of the degree of pose variation dPose, thereby setting a pose variation for forcedly rotating (overturning) the player kart about the Z-axis of the kart coordinate system.

If it is determined that the non-forced overturn time has passed at step S502 (that is, during the above-described third time period), the CPU 10 clears all of the three components of the degree of pose variation dPose to zero (step S521). As a result, the degree of pose variation dPose updated at step S104 in the main process does not take effect on the update of the pose matrix Pose performed at step S109 in the main process. That is, the pose matrix is not changed in the pose control process at step S109 due to zero-set dPose. Instead, processing is performed for changing the pose matrix at steps S522, S523, and S524. That is, after step S521, the CPU 10 performs processing for bringing PoseY, the Y component of the pose matrix Pose, gradually closer to the normal vector N of the ground on which the player kart is placed (step S522). More specifically, the CPU 10 obtains the vector PoseY by the following equation (4), and normalizes the obtained vector.

$$\begin{pmatrix} PoseYx \\ PoseYy \\ PoseYz \end{pmatrix} \leftarrow \begin{pmatrix} PoseYx \\ PoseYy \\ PoseYz \end{pmatrix} + \begin{pmatrix} Nx \\ Ny \\ Nz \end{pmatrix} \times t \quad (4)$$

Note that, Nx, Ny, and Nz in the above-described equation (4) represent an X component, a Y component, and a Z component of the normal vector of the ground by using the world coordinate system, respectively, and a variable t holds a constant selected from among numbers from 0 to 1 as an appropriate value. The greater the value t (that is, the closer to 1 the value t becomes), the faster PoseY, the Y component of the pose matrix Pose, becomes closer to the normal vector N.

Then, the CPU 10 performs processing for bringing PoseZ, the Z component of the pose matrix Pose, gradually closer to the pre-overturn value PPoseZ stored at step S405 in the overturn determination process (step S523). More specifically, the CPU 10 obtains the vector PoseZ by the following equation (5), and normalizes the obtained vector.

$$\begin{pmatrix} PoseZx \\ PoseZy \\ PoseZz \end{pmatrix} \leftarrow \begin{pmatrix} PoseZx \\ PoseZy \\ PoseZz \end{pmatrix} + \begin{pmatrix} PPoseZx \\ PPoseZy \\ PPoseZz \end{pmatrix} \times t \qquad (5)$$

Note that a variable t in the above-described equation (5) is identical with the variable t in the aforementioned equation (4).

Then, the CPU 10 obtains a vector product of the two vectors, the vector PoseZ and the vector PoseY, and sets the obtained vector product as the vector PoseX (step S524). The vector PoseY and the vector PoseZ intersect at right angles, and both are normalized. As a result, the obtained vector PoseX is a normalized vector.

Then, the CPU 10 determines whether PoseY, the Y component of the pose matrix Pose, is closer to the normal vector N of the ground compared to a predetermined value or not (step S525). The CPU 10 then determines whether PoseZ, the Z component of the pose matrix Pose, is closer to the pre-overturn value PPoseZ compared to a predetermined value or not (step S526). If it is determined that the two conditions in steps S525 and S526 are satisfied, the CPU 10 sets the overturn flag OFF (step S527). Otherwise, the CPU 10 performs no processing, whereby the overturn flag maintains the previous value. Then, the CPU 10 ends the overturn process, and returns to the main process.

The following provides a summary of the game processes shown in FIGS. 6 to 10. In this racing game, if the player kart (that is, the player object) is changed into a predetermined pose in the overturn determination process (step S105), the overturn flag is set ON (step S404). After the overturn flag is set ON, the player kart experiences the external forces that cause an overturn (steps S512 and S513) until the forced overturn time period T1 has passed (first time period). As a result, the player kart is overturned forcedly. After a lapse of the forced overturn time period until the end of the non-forced overturn time period T2 (second time period), the player kart does not experience the external forces, and maintains the overturn state by inertia. After the non-forced overturn time period T2 has passed (third time period), the direction of the player kart's height is controlled so as to be gradually closer to the direction of the normal to the ground on which the player kart is placed, and the traveling direction of the player kart is controlled so as to be gradually closer to the pre-overturn traveling direction (steps S522 and S523). When both of the first difference between the direction of the player kart's height and the direction of the normal to the ground and the second difference between the traveling direction of the player kart and the pre-overturn traveling direction fall within a predetermined range, the overturn flag is set OFF (step S527). While the overturn flag is set ON, the operation control process (step S103) is not executed. Thus, the operation input from the controller 2 is not accepted.

FIG. 11 is an illustration showing how the player kart is overturned by the above-described processes. In FIG. 11A, a time period after the overturn of the player kart until the recovery therefrom to a state capable of running again is shown along a time axis. In this example, the player kart is overturned at time A, and recovered from the overturn at time L to a state capable of running again. Assuming that the forced overturn time period T1 corresponds to a time period between time A and time H, and the non-forced overturn time period T2 corresponds to a time period between time H and time J.

FIG. 11B is an illustration showing the poses of the player kart, which are displayed on the screen, during a time period between time A and time L shown in FIG. 11A. During a time period between time A and time H, the player kart experiences the external forces that cause an overturn, and is overturned forcedly. Thus, the player kart of poses A to H shown in FIG. 11B is sequentially displayed on the screen during this time period. During a time period between time H and time J, the player kart does not experience the external forces, and maintains the overturn state by inertia. Thus, the player kart of poses H, I, and J shown in FIG. 11B is sequentially displayed on the screen during this time period. During a time period between time J and time L, the direction of the player kart's height is controlled so as to be gradually closer to the direction of normal to the ground on which the player kart is placed, and the traveling direction of the player kart is controlled so as to be gradually closer to the pre-overturn traveling direction. Thus, the player kart of poses J, K, and L shown in FIG. 11B is sequentially displayed on the screen. At time L, at which the overturn of the player kart is ended, the direction of the player kart's height substantially coincides with the direction of the normal to the ground on which the player kart is placed, and the traveling direction of the player kart substantially coincides with the pre-overturn traveling direction.

As described above, when the player kart (that is, the player object) is changed into a predetermined pose, the game machine according to the first embodiment performs the process for overturning the player kart, and recovers the player kart to a state capable of running again after a lapse of a predetermined time period. As a result, the screen display before the overturn is followed in seamless manners by the screen display after the overturn until a restart of the game. Thus, it is possible to restart the game smoothly, whereby the player can be fully absorbed in the game.

The game machine does not accept the operation input from the controller while the player kart is overturned. Thus, it is possible to automatically control the pose of the player kart with ease. Furthermore, the game machine brings the direction of the player kart's height close to the normal vector of the ground, thereby recovering the player kart to a state capable of running again. Thus, it is possible to naturally display the images used for recovering the player kart to a state capable of restarting the game. Still further, the game machine brings the traveling direction of the player kart close to the pre-overturn traveling direction, thereby recovering the player kart to a state capable of running again. Thus, the player is allowed to continue the game smoothly without losing his/her bearings. Also, the game machine exerts the external forces that cause an overturn so as to overturn the player kart during only the first predetermined time period, and then rolls over the player kart by inertia without exerting the external forces during only the second predetermined time period. Thus, it is possible to naturally display the images in which the player kart is overturned.

Next, with reference to FIGS. 12 to 15, an operation of the game machine according to a second embodiment is described in detail. In the second embodiment, a game performing a spin process when the player kart is changed into a predetermined state is described. In this embodiment, a spin flag is used for indicating whether the player kart is spun or not. Note that the descriptions similar to those of the first embodiment will be omitted.

Figure 13:
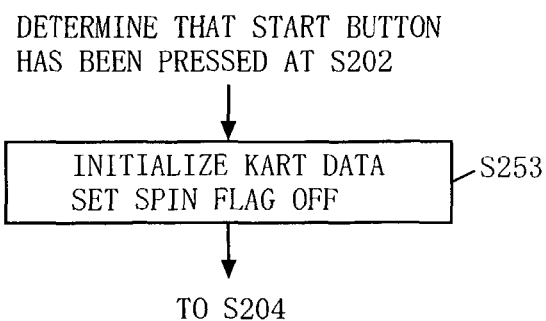
FIG. 13 is a flowchart showing a race preparation process of the game machine according to the second example embodiment of the present invention.

The processes of the second embodiment are different from those of the first embodiment in some steps. FIG. 12 is a portion of a flowchart showing the different steps from the main process (FIG. 6) of the first embodiment. FIG. 13 is a portion of a flowchart showing the different steps from the race preparation process (FIG. 7) of the first embodiment. In the race preparation process according to the second embodiment, after it is determined that the start button 9 is pressed at step S202 (in FIG. 7), the CPU 10 performs a process for initializing the kart data and setting the spin flag OFF at step S253. Then, the CPU 10 proceeds to step S204 (in FIG. 7) (see FIG. 13).

In the main process according to the second embodiment, the CPU 10 determines at step S152 after step S101 (in FIG. 6) whether the spin flag is ON (spin state) or not. Then, the CPU 10 proceeds to step S104 (in FIG. 6) if the spin flag is ON, and proceeds to step S103 (in FIG. 6) if the spin flag is OFF (see FIG. 12A). After step S104 (in FIG. 6), the CPU 10 performs a spin determination process, which will be described below, at step S155. Then, the CPU 10 determines whether the spin flag is ON or not (step S156). If the spin flag is ON, the CPU 10 performs a spin process (step S157), which will be described below, and proceeds to step S108 (in FIG. 6). On the other hand, if the spin flag is OFF, the CPU 10 proceeds to step S108 (in FIG. 6) without performing the spin process (see FIG. 12B).

Figure 14:
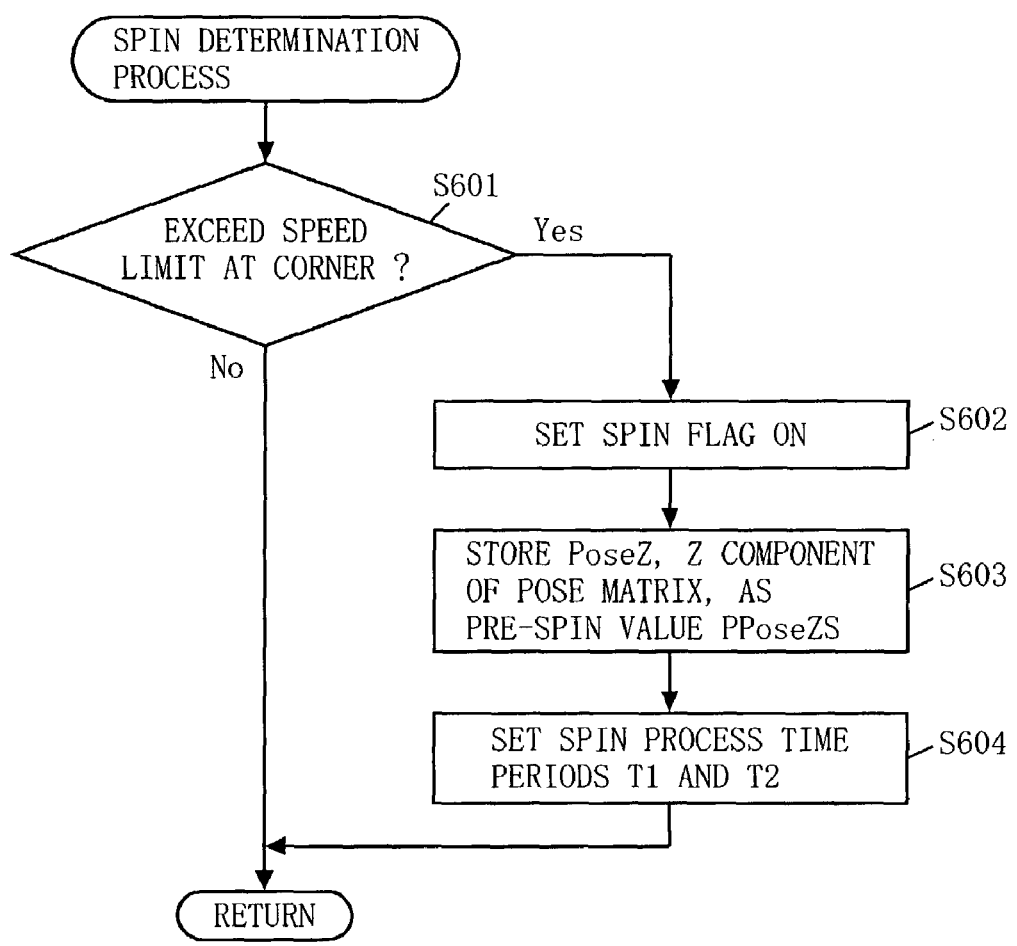
FIG. 14 is a flowchart showing a spin determination process of the game machine according to the second example embodiment of the present invention.

FIG. 14 is a flowchart showing details of the spin determination process (step S155). In the spin determination process, the CPU 10 first determines at step S601 whether the player kart exceeds a speed limit at the corner or not. If it is determined that the player kart does not exceed the speed limit at the corner, the CPU 10 ends the spin determination process without performing the processes from steps S602 to S604, and returns to the main process. On the other hand, if it is determined that the player kart exceeds the speed limit at the corner, the CPU 10 proceeds to step S602. In this case, the CPU 10 sets the spin flag ON (step S602), stores PoseZ, the Z component of the current pose matrix, as a pre-spin value PPoseZS (step S603), and sets a spin process time periods T1 and T2 (step S604). Then, the CPU 10 ends the spin determination process, and returns to the main process.

FIG. 15 is a flowchart showing details of the spin process (step S157). Hereinafter, a portion of the spin process, which is different from that of the overturn process (FIG. 10) of the first embodiment, is described. Also in the spin process, the process is performed based on how much time has passed after it is determined that the player kart is spun. That is, three different processes are performed corresponding to the following three different time periods: 1) a time period until the end of the forced spin time period T1, 2) a time period from the end of the forced spin time period T1 until the end of the non-forced spin time period T2, and 3) a time period after the non-forced spin time period T2. The above-described three time periods are referred to as a first time period, a second time period, and a third time period, respectively.

If it is determined that the forced spin time period T1 has not passed at step S701 (that is, during the above-described first time period), the CPU 10 determines the spin direction at step S711. If the spin direction is in a plus direction, the CPU 10 adds a predetermined value to dPosey, the Y component of the degree of pose variation dPose (step S712). If the spin direction is in a minus direction, the CPU 10 subtracts a predetermined value from dPosey, the Y component of the degree of pose variation dPose (step S713). As such, a predetermined value is added to or subtracted from dPosey, the Y component of the degree of pose variation dPose, thereby setting a pose variation so that the player kart is forcedly spun about the Y-axis of the kart coordinate system.

If it is determined that the non-forced spin time period T2 has not passed at step S702 (that is, during the above-described second time period), the CPU 10 ends the spin process without performing processing, and returns to the main process.

If it is determined that the non-forced spin time has passed at step S702 (that is, during the above-described third time period), the CPU 10 clears the degree of pose variation dPose (step S721), brings PoseZ, the Z component of the pose matrix Pose, gradually closer to the pre-spin value PPoseZS stored at step S603 of the spin determination process (step S722), and obtains the vector PoseX (step S723). Then, the CPU 10 sets the spin flag OFF (step S725) if PoseZ, the Z component of the pose matrix Pose, is closer to the pre-spin value PPoseZS compared to a predetermined value.

As described above, the game machine according to the second embodiment performs a process for spinning the player kart when the player kart (player object) is changed into a predetermined pose, and recovers the traveling direction of the player kart to a pre-spin state after a lapse of a predetermined time period. Thus, it is possible to restart the game smoothly after the player kart is spun, whereby the player can be fully absorbed in the game.

Note that the racing game in which a player object is a player kart has been described above, but a type of the game may be arbitrary as long as the game has a player object corresponding to a player.

Furthermore, the DVD-ROM 3 storing the program of the racing game is assumed to be mounted on the main unit 1, but instead a cassette that contains a memory storing the program may be inserted into the main unit 1. Alternatively, a memory storing the program may be previously built into the main unit 1. Alternatively, the program may be downloaded to the main unit 1 by using the Internet, etc.

Still further, the game machine is assumed not to be provided with a image display section and an audio output section, and the image and audio are assumed to be output from the television, but instead the game machine may be provided with a liquid crystal screen and/or a built-in loud speaker, etc. Also, the controller 2 is assumed to be removably connected to the main unit 1, but instead the controller 2 may be united with the main unit 1 by providing a casing of the main unit 1 with a press button, for example.

While example embodiments of the invention have been described in detail, the foregoing description is in all aspects illustrative and not restrictive. It is understood that numerous other modifications and variations can be devised without departing from the scope of the invention.

What is claimed is:

1. A game machine that executes a game program causing a player object to appear in a virtual space, comprising:
   one or more computer processing devices configured to perform:
      pose control processing for determining a pose of the player object;
      overturn determination processing for determining that the player object is to be overturned if the player object is determined to be in a predetermined pose;
      overturn processing for overturning the player object if it is determined that the player object is to be overturned by the overturn determination processing;
      overturn recovery processing for controlling the pose of the player object overturned by the overturn processing and recovering the player object to a state for restarting the game; and
      traveling direction storage locations for storing a traveling direction of the pre-overturned player object if it is determined that the player object is to be overturned by the overturn determination processing, wherein the overturn recovery processing uses the traveling direction of the pre-overturned player object stored in the traveling direction storage locations to control the pose of the overturned player object so as to bring the traveling direction of the overturned player object gradually and continuously close to the traveling direction stored in the traveling direction storage locations.

2. The game machine according to claim 1, further comprising:
a player controller operated by a player; and
the one or more computer processing devices is configured to perform:
operation control for controlling a state of player object based on an operation input from the player controller, wherein
the operation control inhibits acceptance of the operation input during a time period after the overturn processing overturns the player object until the overturn recovery processing recovers the player object to the state for restarting the game.

3. The game machine according to claim 1, wherein the overturn recovery processing controls the pose of the overturned player object so as to bring the axis defining the player object's height close to a direction of normal to a ground on which the player object is placed.

4. The game machine according to claim 3, wherein the overturn recovery processing brings the axis defining the player object's height gradually closer to the direction normal to the ground, and ends a process for controlling the pose of the overturned player object if a difference between the axis defining the player object's height and the direction normal to the ground falls within a predetermined range.

5. The game machine according to claim 1, wherein
the pose control processing obtains a degree of pose variation of the player object based on an external force exerted on the player object, and controls the pose of the player object based on the obtained degree of pose variation, and
the overturn processing exerts, only during a first predetermined time period, an external force that causes an overturn in a direction that the player object is to be overturned, and overturns the player object.

6. The game machine according to claim 5, wherein the overturn processing maintains an overturn state of the player object only during a second predetermined time period after a lapse of the first predetermined time period without exerting the external force that causes the overturn.

7. The game machine according to claim 1, wherein the game machine executes a racing game causing a race kart, which is the player object, to run on a predetermined course,
the player controller controls at least a movement of the race kart,
the pose control processing determines a pose of the race kart based on at least an external force exerted on the race kart,
the overturn determination processing determines that the race kart is to be overturned if the race kart is determined to be in a predetermined pose,
the overturn processing overturns the race kart, and
the overturn recovery processing recovers the overturned race kart to an upright state.

8. A game machine that executes a racing game causing a race kart to run on a predetermined course, comprising:
a player controller operated by a player;
one or more computer processing devices configured to perform:
operation control for controlling at least a movement of the race kart based on an operation input from the player controller;
rotation determination processing for determining whether the race kart is to be rotated or not;
traveling direction storage locations for storing a traveling direction of the pre-rotated race kart if it is determined that the race kart is to be rotated by the rotation determination processing;
the one or more computer processing devices is configured to further perform:
rotation processing for rotating the race kart if it is determined that the race kart is to be rotated by the rotation determination processing; and
rotation recovery processing which uses the traveling direction of the pre-rotated race kart stored in the traveling direction storage locations to bring a traveling direction of the race kart rotated by the rotation processing programmed logic circuitry gradually and continuously close to the traveling direction stored in the traveling direction storage locations.

9. A non-transitory computer readable medium encoded with a game program for causing a game machine to play a game that causes a player object associated with a player to appear in a virtual space, the game program causing the game machine to execute:
a pose control including determining a pose of the player object;
an overturn determination including determining that the player object is to be overturned if the player object is in a predetermined pose;
an overturn processing including overturning the player object if it is determined that the player object is to be overturned in the overturn determination;
an overturn recovery including controlling the pose of the player object overturned at the overturn processing and recovering the player object to a state for restarting the game;
a storage operation including storing a traveling direction of the pre-overturned player object if it is determined that the player object is to be overturned at the overturn determination, wherein
the overturn recovery uses the traveling direction of the pre-overturned player object stored in the traveling direction storage locations to control the pose of the overturned player object so as to bring the traveling direction of the overturned player object gradually and continuously close to the stored traveling direction.

10. The non-transitory computer readable medium according to claim 9, the game program causing the game machine to further execute:
receiving an operation input from an operation section operated by the player; and
controlling a state of the player object based on the received operation input, wherein
the control of the state of the player object inhibits acceptance of the operation input during a time period after the player object is overturned at the overturn processing until the player object is recovered at the overturn recovery to the state for restarting the game.

11. The non-transitory computer readable medium according to claim 10, wherein the game program causes a game machine to execute a racing game causing a race kart, which is the player object, to run on a predetermined course,
the operation control controls at least a movement of the race kart, the pose control determines a pose of the race kart based on at least an external force exerted on the race kart, the overturn determination determines that the race kart is to be overturned if the race kart in a predetermined pose, the overturn processing overturns the race kart, and the overturn recovery recovers the overturned race kart to an upright state.

12. The non-transitory computer readable medium according to claim 9, wherein the overturn recovery controls the pose of the overturned player object so as to bring the axis defining the player object's height close to a direction of a normal to a ground on which the player object is placed.

13. The non-transitory computer readable medium according to claim 12, wherein the overturn recovery brings the direction of the player object's height gradually closer to the direction of the normal, and ends a process for controlling the pose of the overturned player object if a difference between the axis defining the player object's height and the direction of the axis defining normal to the ground falls within a predetermined range.

14. The non-transitory computer readable medium according to claim 9, wherein the pose control obtains a degree of pose variation of the player object based on an external force exerted on the player object, and controls the pose of the player object based on the obtained degree of pose variation, and the overturn processing exerts, only during a first predetermined time period, an external force that causes an overturn in a direction that the player object is to be overturned, and overturns the player object.

15. The non-transitory computer readable medium according to claim 14, wherein the overturn processing maintains an overturn state of the player object during only a second predetermined time period after a lapse of the first predetermined time period without exerting the external force that causes the overturn on the player object.

16. A non-transitory computer readable medium encoded with a game program that causes a game machine to play a racing game causing a race kart to run on a predetermined course, the game program causing the game machine to execute:

operation input including receiving an operation input from an operation section operated by a player;

operation control including controlling at least a movement of the race kart based on the operation input received at the operation input;

rotation determination including determining whether the race kart is to be rotated;

storage operation including storing a traveling direction of the pre-rotated race kart if it is determined that the race kart is to be rotated at the rotation determination;

rotation processing including rotating the race kart if it is determined that the race kart is to be rotated at the rotation determination; and rotation recovery which uses the stored traveling direction of the pre-rotated race kart so as to bring a traveling direction of the race kart rotated by the rotation processing gradually and continuously close to the stored traveling direction.

17. A game machine for executing a game causing a player object corresponding to a player to appear in a virtual space, the game machine comprising:

a pose control means for determining a pose of the player object;

an overturn determination means for determining based on the pose of the player object whether the player object is to be overturned;

a traveling direction storing means for storing a traveling direction of the player object before being overturned if the overturn determination means has determined that the player object is to be overturned;

an overturn processing means for overturning the player object if the overturn determination means has determined that the player object is to be overturned; and an overturn recovery means for recovering the player object, to a state capable of restarting the game, by using the traveling direction of the pre-overturned player object stored in the traveling direction storage locations to bring the pose of the player object overturned by the overturn processing means gradually and continuously towards an upright state and bringing a traveling direction of the player object gradually and continuously towards the traveling direction stored in the traveling direction storing means.

18. The game machine according to claim 17, further comprising:

an operation means operated by the player; and an operation control means for controlling a state of the player object based on an operation input from the operation means, wherein the operation control means inhibits acceptance of the operation input during a time period after the overturn processing means overturns the player object until the overturn recovery means recovers the player object to the state capable of restarting the game.

19. The game machine according to claim 17, wherein the overturn recovery means brings the direction of the player object's height gradually closer to the direction of the normal, and ends a process for controlling the pose of the overturned player object if a difference between the direction of the player object's height and the direction of the normal falls within a predetermined range.

20. The game machine according to claim 17, wherein the player object is a race kart, and the game is a racing game causing the race kart to run on a predetermined course in the virtual space.

* * * * *